United States Patent
Inada et al.

(10) Patent No.: US 8,928,694 B2
(45) Date of Patent: Jan. 6, 2015

(54) IMAGE PROCESSING APPARATUS RECEIVING EDITING OPERATION, IMAGE DISPLAY DEVICE, AND IMAGE PROCESSING METHOD THEREOF

(71) Applicant: Sony Computer Entertainment Inc., Tokyo (JP)

(72) Inventors: Tetsugo Inada, Kanagawa (JP); Akio Ohba, Kanagawa (JP); Hiroyuki Segawa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/741,448

(22) Filed: Jan. 15, 2013

(65) Prior Publication Data
US 2013/0135347 A1    May 30, 2013

Related U.S. Application Data

(63) Continuation of application No. PCT/JP2011/002455, filed on Apr. 26, 2011.

(30) Foreign Application Priority Data

Jul. 23, 2010  (JP) ................. 2010-166056

(51) Int. Cl.
  *G09G 5/00*   (2006.01)
  *G06T 11/60*  (2006.01)
  *G09G 5/395*  (2006.01)

(52) U.S. Cl.
  CPC ............... *G06T 11/60* (2013.01); *G09G 5/395* (2013.01)
  USPC ......................................... 345/629; 345/501

(58) Field of Classification Search
  USPC .................................................. 345/629, 501
  See application file for complete search history.

(56) References Cited

U.S. PATENT DOCUMENTS 5,790,134 A * 8/1998 Lentz ............................ 345/502
6,563,999 B1   5/2003 Suzuoki
(Continued)

FOREIGN PATENT DOCUMENTS

| JP | 2008512745 A | 4/2008 |
| JP | 2010085779 A | 4/2010 |
| JP | 2010117827 A | 5/2010 |
| JP | 2010125040 A | 6/2010 |

OTHER PUBLICATIONS

Tanner et al. (The Clipmap: A Virtual Mipmap, 1998).*

(Continued)

*Primary Examiner* — Maurice L McDowell, Jr.
*Assistant Examiner* — Kyle Zhai
(74) *Attorney, Agent, or Firm* — Matthew B. Dernier, Esq.; Gibson & Dernier LLP

(57) ABSTRACT

An original image to be edited is displayed using hierarchical data. As a user draws a figure in a region of the image as an edit action, an image data updating unit generates a layer having a hierarchical structure composed of the rendered region only. More specifically, the image of the region to be edited is used as the lowermost hierarchical level, and upper hierarchical levels than this lowermost level are generated by reducing the lowermost level, as appropriate, so as to produce hierarchical data. As, during image display, it is checked that the updated region is contained in a frame to be displayed anew, the image of the layer is displayed by superposing the frame on the original hierarchical data.

9 Claims, 20 Drawing Sheets

(56) References Cited

U.S. PATENT DOCUMENTS

| | | |
|---|---|---|
| 2006/0053374 A1 | 3/2006 | Wilensky |
| 2008/0246777 A1* | 10/2008 | Swanson et al. .............. 345/640 |
| 2008/0317431 A1* | 12/2008 | Mishima et al. ................ 386/52 |
| 2013/0162678 A1* | 6/2013 | Harris .......................... 345/634 |

OTHER PUBLICATIONS

International Search Report for corresponding PCT Application No. PCT/JP2011/002455, dated Jul. 5, 2011.

International Preliminary Report on Patentability and Written Opinion for corresponding PCT Application No. PCT/JP2011/002455, dated Feb. 12, 2013.

Sylvain Lefebvre, et. al., Unified Texture Management for Arbitrary Meshes, Rapport de recherche, No. 5210, pp. 1-20, Institut National De Recherche En Informatique Et En Automatique (May 2004).

Martin Kraus, et. al., Adaptive Texture Maps, Graphics Hardware, pp. 1-10, The Eurographics Association (2002).

Office Action issued for corresponding Japanese Patent Application No. 2010-166056, dated Jul. 9, 2013.

* cited by examiner

IMAGE PROCESSING APPARATUS RECEIVING EDITING OPERATION, IMAGE DISPLAY DEVICE, AND IMAGE PROCESSING METHOD THEREOF

BACKGROUND OF THE INVENTION

1. Field of the Invention

The present invention relates to an image processing technology for enlarging/reducing or shifting vertically and horizontally images shown on a display.

2. Description of the Related Art

There are proposed home entertainment systems capable of not only executing game programs but also playing the video. In these home entertainment systems, a GPU generates three-dimensional images using polygons (see Patent Document 1, for instance).

How efficiently images are displayed is always an important problem whatever the purpose of the image display is. Various contrivances have been called for to render high-definition images in particular at high speed, and a technique for efficiently performing a texture mapping while storing the texture data separately from the image data has been proposed, for instance (see References (2) and (3) in the following Related Art List, for instance).

RELATED ART LIST (1) U.S. Pat. No. 6,563,999.
(2) Sylvain Lefebvre, et. al., Unified Texture Management for Arbitrary Meshes, Rapport de recherche, No. 5210, May 2004, Institut National De Recherche En Informatique Et En Automatique.
(3) Martin Kraus, et. al., Adaptive Texture Maps, Graphics Hardware (2002), pp. 1-10, The Eurographics Association.

Where the aforementioned technique contriving the data structure such as the technique involving the texture mapping is used, the following problem arises. That is, once the data for a displayed image is prepared and constructed, the processing is likely to get complicated if a part of the image needs to be updated or altered. As a result, the higher the resolution of images and the larger the size thereof, further advanced knowledge in preparing and editing the images will be required. Also, the load of the processing for an information processing apparatus increases and the responsiveness in the updating of data and the display of images drops.

SUMMARY OF THE INVENTION

The present invention has been made in view of these problems, and a purpose thereof is to provide an image processing technology that achieves efficient data updating and image rendering even in the case of high-definition images.

One embodiment of the present invention relates to an image processing apparatus. The image processing apparatus includes: a storage unit for storing hierarchical data, the hierarchical data being formed such that image data representing a single image at different resolutions is hierarchized in order of resolution; a display image processing unit configured to render an image in a display region by switching a hierarchical level of the hierarchical data in response to a request for changing the display region, inputted by a user; and an image data updating unit configured to receive a user's edit operation input for the rendered image in the display region and configured to store, as edited data in the storage unit, both original hierarchical data and updating hierarchical data, which represents an edited image in a region to be edited in the original hierarchical data, wherein the display image processing unit performs rendering such that an image of the updating hierarchical data is superposed on an image of the original hierarchical data.

Another embodiment of the present invention relates to an image displaying apparatus. The image displaying apparatus includes: a decoding unit configured to decode hierarchical data and updating hierarchical data indicating an edited image for a region to be edited in an image of the hierarchical data, the hierarchical data being formed such that image data representing a single image at different resolutions is hierarchized in order of resolution; and an integration rendering unit configured to switch a hierarchical level in each of the hierarchical data and the updating hierarchical data in response to the request, for changing the display region, inputted by the user and then configured to interpose images of the decoded data so as be rendered.

Still another embodiment of the present invention relates to an image processing method. The image processing method includes: retrieving hierarchical data from memory, the hierarchical data being formed such that image data representing a single image at different resolutions is hierarchized in order of resolution; rendering an image in a display region by switching a hierarchical level of the hierarchical data in response to a request for changing of the display region, inputted by a user; receiving a user's edit operation input for the rendered image in the display region and storing, as edited data in the memory, both original hierarchical data and updating hierarchical data, which represents an edited image in a region to be edited in the original hierarchical data; and performing rendering such that an image of the updating hierarchical data is superposed on an image of the original hierarchical data.

Still another embodiment of the present invention relates to a data structure of an image file. The image file is retrieved from a storage device, to display at least part of an image on a display, wherein hierarchical data of an original image, formed such that image data representing a single image at different resolutions is hierarchized in order of resolution, is associated with updating hierarchical data, the hierarchical data representing an edited image in a region to be edited in the original image and representing an image to be superposed on the original image during image display.

Still another embodiment of the present invention relates to a data structure of an image file. The image file is retrieved from a storage device, to display at least part of an image on a display, wherein hierarchical data of an original image, formed such that image data representing a single image at different resolutions is hierarchized in order of resolution, is associated with a plurality of updating hierarchical data and hierarchical data of images for stacking order information, the plurality of updating hierarchical data representing edited images in a region to be edited in the original image and representing images to be superposed on the original image during image display, and the hierarchical data of images for stacking order information being associated each of the plurality of updating hierarchical data wherein the image for stacking order information holds, as pixel values, a parameter that expresses stacking order of images of the updating hierarchical data to be superposed when rendering.

Optional combinations of the aforementioned constituting elements, and implementations of the invention in the form of methods, apparatuses, systems, computer programs, and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

First Embodiment

Image data to be processed in the present embodiment has a hierarchical structure which is constituted by images of different resolutions generated by reducing an original image in a plurality of stages. An image at each hierarchical level is divided into one or more tile images. For example, an image of the lowest resolution is made up of a single tile image, whereas an image of the highest resolution is made up of a highest number of tile images. During image display, an enlarged display or a reduced display is effected with speed by switching the tile image being used in the rendering to the tile image of a different hierarchical level when the displayed image reaches a predetermined resolution.

Firstly, a description will be given of a basic display mode for images having a hierarchical structure as described above.

Figure 1:
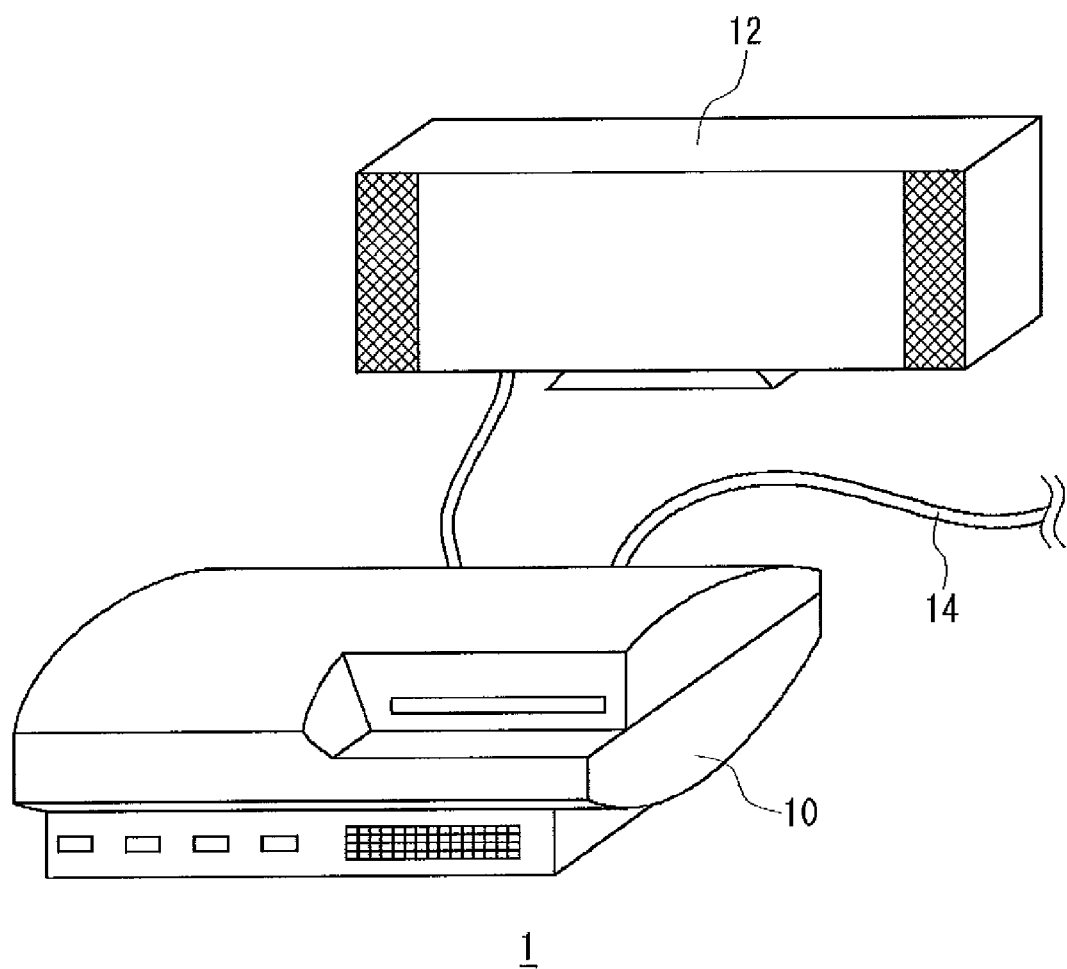
FIG. 1 illustrates a usage environment of an image processing system to which a first embodiment is applicable.

FIG. 1 illustrates a usage environment of an image processing system 1 to which the present embodiment is applicable. The image processing system 1 includes an image processing apparatus 10 for executing image processing software and a display device 12 for outputting the results of processing by the image processing apparatus 10. The display device 12 may be a television set which has a display for outputting images and a speaker for outputting sounds.

The display device 12 may be connected to the image processing apparatus 10 by a cable or connected wirelessly thereto by a wireless LAN (Local Area Network) or the like. In the image processing system 1, the image processing apparatus 10 may be connected to an external network such as the Internet via a cable 14 and thereby acquire hirerachized compressed image data by downloading them. Note that the image processing apparatus 10 may be wirelessly connected to the external network.

The image processing apparatus 10 may be a game device or personal computer, for instance, and may perform an image processing function by loading an application program for image processing. The image processing apparatus 10 performs such processings as enlarging/reducing the images displayed on a display of the display device 12 and scrolling the images vertically and horizontally, upon request from a user. Hereinafter, such a processing, of changing the display regions, including the processing of enlarging/reducing the images will be expressed as "moving the display regions" also. When the user operates an input device while watching the images shown on the display, the input device transmits a display region changing request signal to the image processing apparatus 10.

Figure 2:
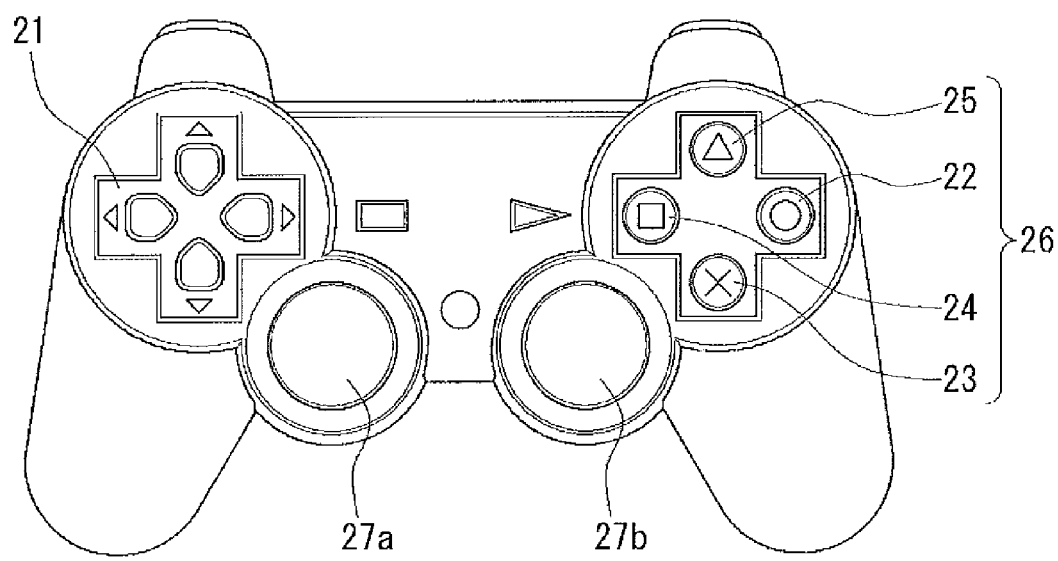
FIG. 2 shows an example of an external structure of an input device that is applicable to the image processing system of FIG. 1.

FIG. 2 shows an example of an external structure of an input device 20. As operating means operable by the user, the input device 20 includes a directional key 21, analog sticks 27a and 27b, and four control buttons 26. The four control buttons 26 are a "o" (circle) button 22, a "x" (cross) button 23 a "□" (square) button 24, and a "Δ" (triangle) button 25.

In the image processing system 1, the operating means of the input device 20 is assigned to perform the functions of inputting requests for enlarging/reducing the displayed image and requests for vertical and horizontal scrolls. For example, the input function of an enlargement/reduction request of the displayed image is assigned to the right-hand analog stick 27b. The user can input a request for reduction of the displayed image by pulling the analog stick 27b toward himself/herself and a request for enlargement of the displayed image by pushing it away.

Also, the input function of scroll requests is assigned to the directional key 21. The user can press down the directional key 21 and input a scroll request in the direction toward which the directional key 21 is pressed down. It is to be noted that the input function of requests for moving the display region may be assigned to another operating means. For example, the input function of scroll requests may be assigned to the analog stick 27a.

The input device 20, having the function of transmitting the inputted display-region-moving request signal to the image processing apparatus 10, is so structured as to be able to wirelessly communicate with the image processing apparatus 10 in this embodiment. The input device 20 and the image processing apparatus 10 may establish wireless connection with each other using the Bluetooth (registered trademark) protocol, the IEEE802.11 protocol, or the like. The input device 20 may transmit the request signals to the image processing apparatus 10 through a cable connection therewith.

As will be discussed later, the input device 20 also receives a user's request for the editing of an image such as an addition of a figure or pattern. For that purpose, the functions of inputting a request for shifting the cursor and a selection from the options displayed on a displayed image may be assigned to the analog sticks 27a and 27b and/or the directional key 21. And the function of determining the editing may be assigned to the circle button 22. Or the input device 20 to which such functions are assigned may be selected, as appropriate, from general input devices such as mouse and touch panel.

Figure 3:
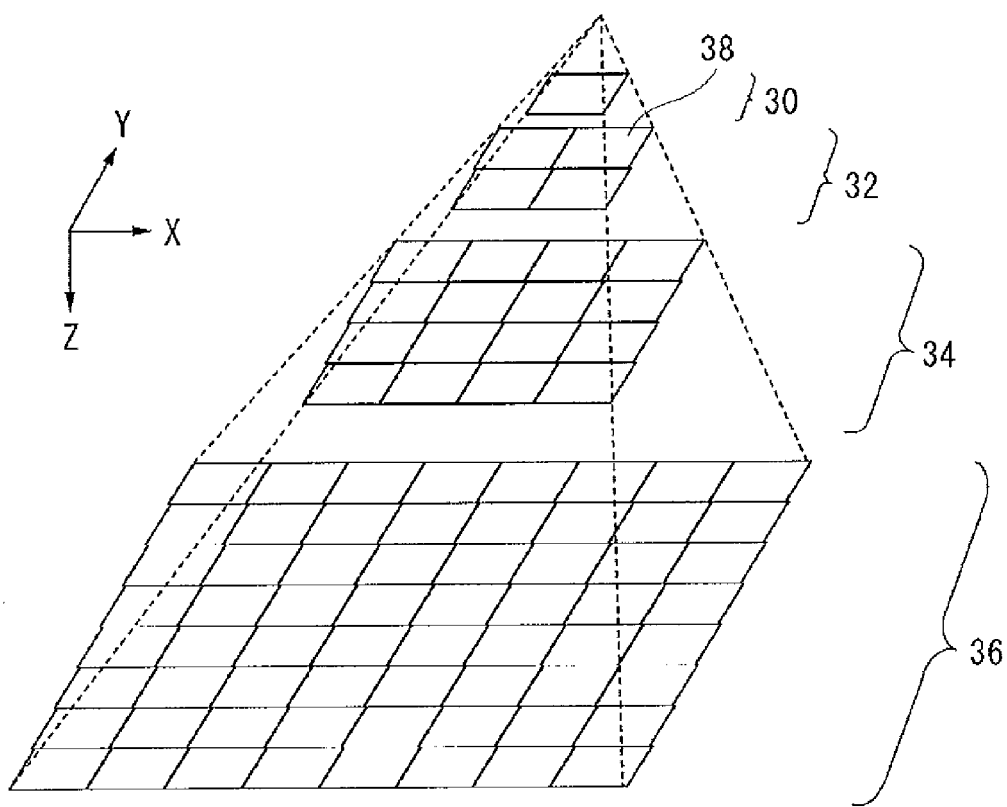
FIG. 3 shows a hierarchical structure of image data used in a first embodiment.

FIG. 3 shows a hierarchical structure of image data that is used in the present embodiment. The image data has a hierarchical structure comprised of 0-th hierarchical level 30, 1st hierarchical level 32, 2nd hierarchical level 34, and 3rd hierarchical level 36 in a depth (Z axis) direction. Note that while only four hierarchical levels are shown in FIG. 3, the number of hierarchical levels is not limited thereto. Hereinafter, image data having a hierarchical structure like this is referred to as "hierarchical data".

The hierarchical data shown in FIG. 3 has a quadtree hierarchical structure, and the hierarchical levels have each one or more tile images 38. All the tile images 38 are formed in the same size having the same number of pixels, for example, 256×256 pixels. The image data at each hierarchical level represents a single image at different resolution, and the image data at the 2nd hierarchical level 34, 1st hierarchical level 32, and 0-th hierarchical level 30 are generated by reducing an original image of the 3rd hierarchical level 36 having the highest resolution in a plurality of stages. For example, the resolution of the Nth hierarchical level (N being an integer greater than or equal to 0) may be ½ of the resolution of the (N+1)th hierarchical level in both the horizontal (X axis) and vertical (Y axis) directions.

In the image processing apparatus 10, the hierarchical data, which is compressed in a preselected compression format, is stored in a storage device. And it is read out from the storage device and decoded before displayed on the display. The image processing apparatus 10 according to the present embodiment has decoding functions compatible with multiple kinds of compression formats and is therefore capable of decoding compressed data in the S3TC format, the JPEG format, and the JPEG2000 format, for instance.

The hierarchical structure of the hierarchical data, as shown in FIG. 3, forms a virtual three-dimensional space with the horizontal direction set on the X axis, the vertical direction set on the Y axis, and the depth direction set on the Z axis. The image processing apparatus 10 first derives the amount of change of the display region from the display-region-moving request signal supplied by the input device 20 and then derives the coordinates of the four corners of a frame (frame coordinates) in a virtual space using the amount of change. Note that the image processing apparatus 10 may derive information identifying a desired hierarchical level and the texture coordinates (UV coordinates) of the hierarchical level instead of the frame coordinates in the virtual space Hereinafter, the combination of the information identifying the hierarchical level and the texture coordinates will also be referred to as frame coordinates.

Figure 4:
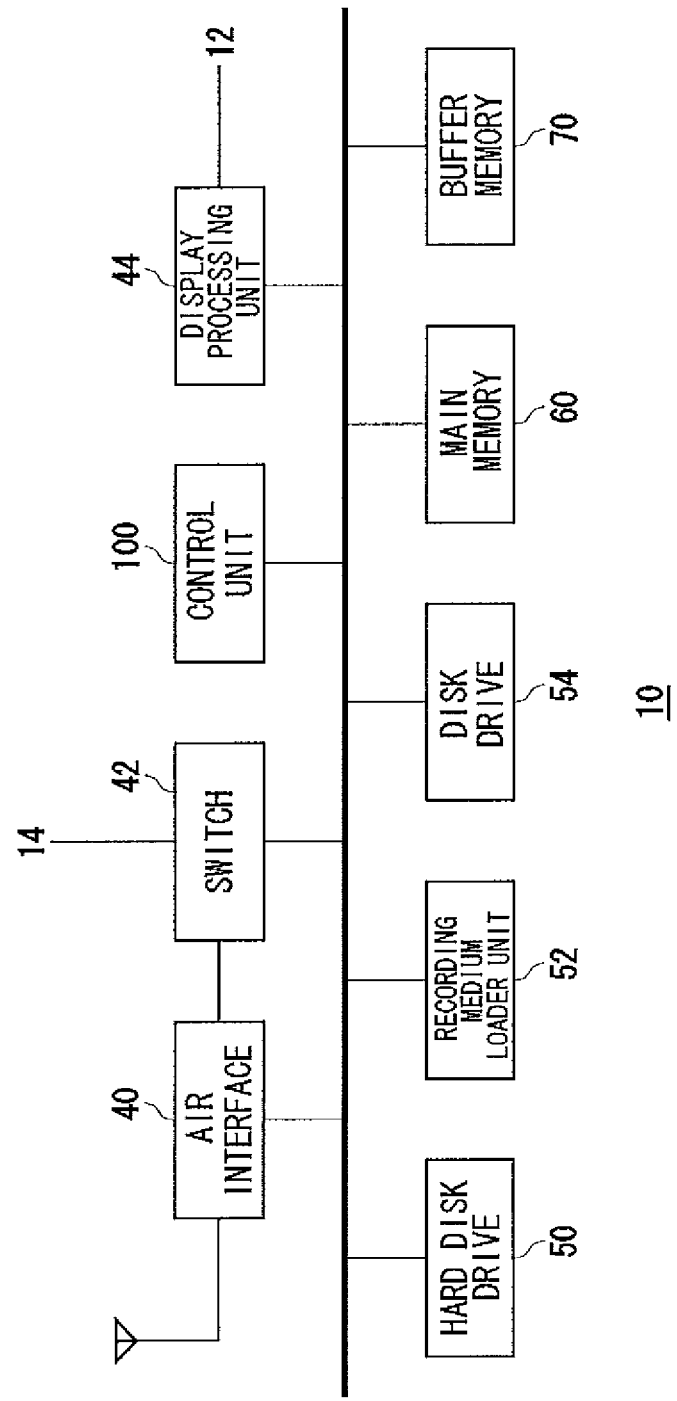
FIG. 4 shows a structure of an image processing apparatus according to a first embodiment.

FIG. 4 shows a structure of the image processing apparatus 10. The image processing apparatus 10 is configured by including an air interface 40, a switch 42, a display processing unit 44, a hard disk drive 50, a recording medium loading unit 52, a disk drive 54, a main memory 60, a buffer memory 70, and a control unit 100. The display processing unit 44 has a frame memory that buffers data to be displayed on the display device 12.

The switch 42 is an Ethernet switch (Ethernet is a registered trademark), a device connected to an external device by cable or wirelessly so as to transmit and receive data. The switch 42, which connects to an external network via a cable 14, is so configured as to be able to receive hirerachized compressed image data from an image data server. Also, the switch 42 connects the wireless interface 40 which connects to the input device 20 through a predetermined wireless protocol. The display-region-moving request signal entered by the user in the input device 20 passes through the wireless interface 40 and the switch 42 so as to be supplied to the control unit 100.

The hard disk drive 50 functions as a storage device for storing data. The compressed image data is stored in the hard disk derive 50. The recording medium loading unit 52 reads out data from a removable recording medium when the removable medium such as a memory card is mounted. When a read-only ROM disk is mounted, the disk drive 54 recognizes the ROM disk by driving the ROM disk and then reads out the data. The ROM disk may be an optical disk, a magneto-optical disk or the like. The compressed image data may be stored in such a recording medium as described above.

The control unit 100 comprises a multi-core CPU where each CPU has a general-purpose processor core and a plurality of simple processor cores. The general-purpose processor core is called PPU (PowerPC Processor Unit), and the remaining processor cores are called SPUs (Synergistic Processor Units).

The control unit 100 includes a memory controller connected to the main memory 60 and the buffer memory 70. The PPU is provided with a register and a main processor as an entity of execution of calculation. The PPU efficiently allocates tasks as basic units of processing in applications to the respective SPUs. The PPU itself may execute a task. The SPU is provided with a register, a subprocessor as an entity of execution of calculation, and a local memory as a local storage area. The local memory may be used as the buffer memory 70.

The main memory 60 and the buffer memory 70, which are storage devices, are each configured as RAM (Random Access Memory). SPU has a dedicated DMA (Direct Memory Access) controller as a control unit. Thus, SPU can achieve high-speed data transfer between the main memory 60 and the buffer memory 70, and can also achieve high-speed data transfer between frame memory in the display processing unit 44 and the buffer memory 70. The control unit 100 according to the present embodiment has a plurality of SPUs operated in parallel with one another, thereby achieving a high-speed image processing function. The display processing unit 44, which is connected to the display device 12, outputs an image processing result according to a user's request.

In order that a displayed image can be smoothly changed when the processing of enlarging/reducing the displayed image and the processing of moving or shifting the display region are performed, the image processing apparatus 10 according to the present embodiment loads a part of the compressed image data into the main memory 60 from the hard disk drive 50. Also, a part of the compressed data loaded into the main memory 60 is decoded and then stored in the buffer memory 70. Such a method as described above allows the image used for the generation of a displayed image to be switched instantaneously with the timing required later. At this time, tile images to be loaded or decoded may be determined through prefetch process for a region, which will be required later, based on the moving directions so far of the display regions.

Figure 5:
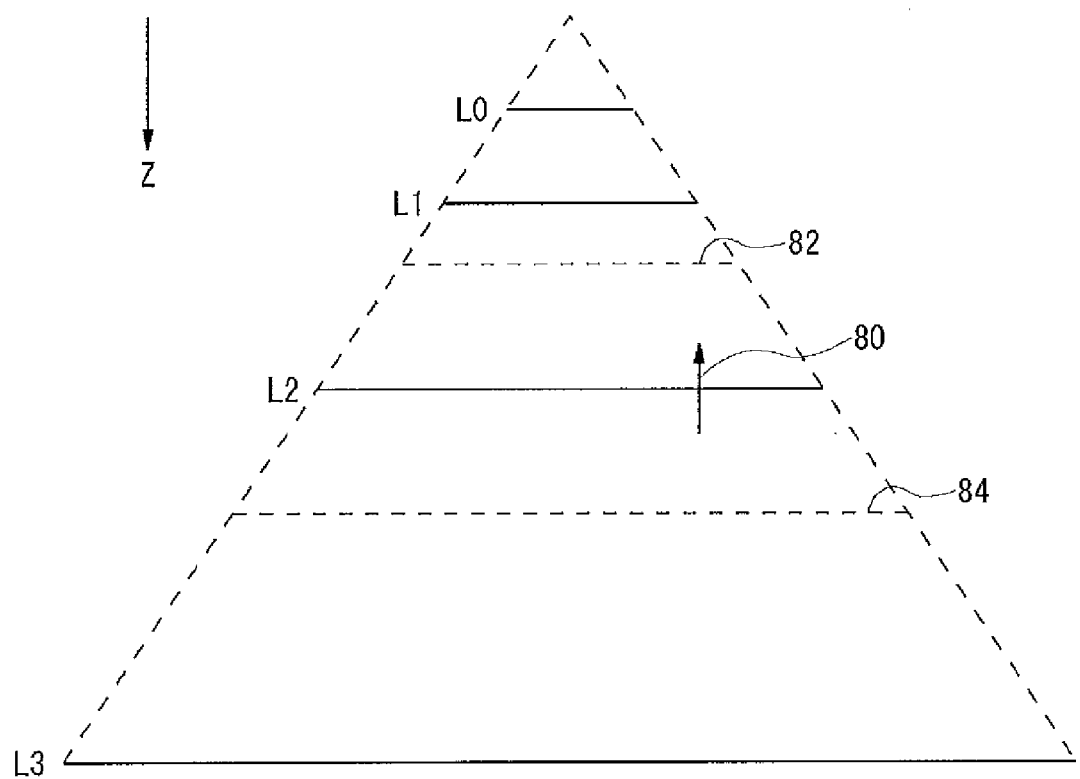
FIG. 5 is a diagram to explain prefetch processing of image data according to a first embodiment.

FIG. 5 is a diagram to explain prefetch processing of image data. FIG. 5 shows a hierarchical structure of image data, and the respective hierarchical levels are expressed by L0 (0-th hierarchical level), L1 (1st hierarchical level), L2 (2nd hierarchical level), and L3 (3rd hierarchical level) starting from top. In the hierarchical data structure shown in FIG. 5, a position in the depth (Z axis) direction indicates the resolution. That is, the closer to L0 the position in the Z axis is, the lower the resolution will be, whereas the closer to L3 the position in the Z axis is, the higher the resolution will be. In relation to the size of an image displayed on the display, the position in the depth direction, which corresponds to the scale, is such that the scales of the images at L2, L1, and L0 are respectively ¼, ¹⁄₁₆, and ¹⁄₆₄ when the scale of the image at L3 is 1.

Thus, when a displayed image changes from an L0 side to an L3 side along the depth direction, the displayed image is enlarged. In contrast, when the displayed image changes from an L3 side to an L0 side, the displayed image is reduced. An arrow 80 indicates that the display-region-moving request signal by the user requests a reduction of the displayed image and shows that reduction occurs across the scale of ¼ (L2). The image processing apparatus 10 sets the positions of L1 and L2 in the depth direction at which the tile images 38 are prepared, to prefetch boundaries in the depth direction. As the image to be displayed changes across the prefetch boundary as a result of the display-region-moving request signal, the image processing apparatus 10 starts the prefetch processing.

When the scale of the displayed image is close to L2, the displayed image is created using a tile image of L2 (2nd hierarchical level). More specifically, when the scale of the image to be displayed is between a switching boundary 82 and a switching boundary 84, the tile images of L2 is used, the boundary 82 being between the tile images of L1 and the tile images of L2, and the boundary 84 being between the tile images of L2 and the tile images of L3. Thus, when the processing of reducing the images is requested as indicated by the arrow 80, the enlarged version of the image in L2 is turned into a reduced version and displayed. At the same time, tile images 38 required in the future that are predicted based on the display-region-moving request signal are identified and decoded beforehand. In the example of FIG. 5, when the requested scale based on the display-region-moving request signal exceeds L2, the image processing apparatus 10 reads a title image 38 of L1 in a reduction direction from the hard disk drive 50 or the main memory 60, then decodes the title image 38 and writes the decoded title image 38 to the buffer memory 70.

Though a description has been given so far of the prefetch processing in the depth direction, the prefetch processing in the upward, downward, leftward, or rightward direction is also performed similarly. More specifically, the prefetch boundary is set in the image data expanded in the buffer memory 70 so that the prefetch processing is started when the display position indicated by display-region-moving request signal exceeds the prefetch boundary.

Consider a case where the user himself adds a graphic or figure to the hierarchical data as described so far, paints it with color(s), and the like so as to update a part of the image. Hereinafter, such an action as this by the user will be referred to as "editing". Although a description will be hereinafter given mainly of a case where a figure or pattern will be drawn as the editing action, the user may similarly draw characters, affix another image, apply colors thereto, erase them and the like.

Similar to a case when a general rendering apparatus is used, the user has the display device 12 display the entire or partial image and then draws a desired figure or pattern by moving a cursor using the input device 20, for example. If, in so doing, an image to be edited is such hierarchical data as the above-described one, the procedure required for updating of data will be more complicated than the procedure performed on an image with no hierarchical structure.

In other words, the following (1) to (3) processes will be required.
(1) The content that the user has rendered on the image displayed on the display device 12 is stored in a working buffer.
(2) At the time when the content drawn by the user has been determined, the content of the working buffer is added to the image data of a hierarchical level at which the editing is to be done, namely, a hierarchical level, for example, which is used to display an image on the display device 12 at that time, and then the image data added with the content of the working buffer is compressed and coded.
(3) Image data at the other hierarchical levels is decoded. The content of the working buffer is enlarged/reduced according to the resolution of each hierarchical level, is then added to the decoded image and is compressed and coded so as to update the original hierarchical data.

For a small region, too, in a higher hierarchical level where the resolution is low, the lower the hierarchical level is and therefore the higher the resolution becomes, the image size of the corresponding region will increase. As a result, if the number of hierarchical levels for image data is large, the number of tile images to be updated even for a small editing task at a higher hierarchical level will be enormous. In a case, for example, where used is the hierarchical data having a quadtree hierarchical structure as described above and where a tile image in the 1st hierarchical level is to be updated, four (2×2) tile images are required to be updated at the 2nd hierarchy level, and $2^{n-1} \times 2^{n-1}$ are required to be updated at the nth hierarchical level. In the light of this, the present embodiment improves efficiency of data updating by employing a method and structure such that a user's edit content is held as hierarchical data that differs from the original hierarchical data.

Figure 6:
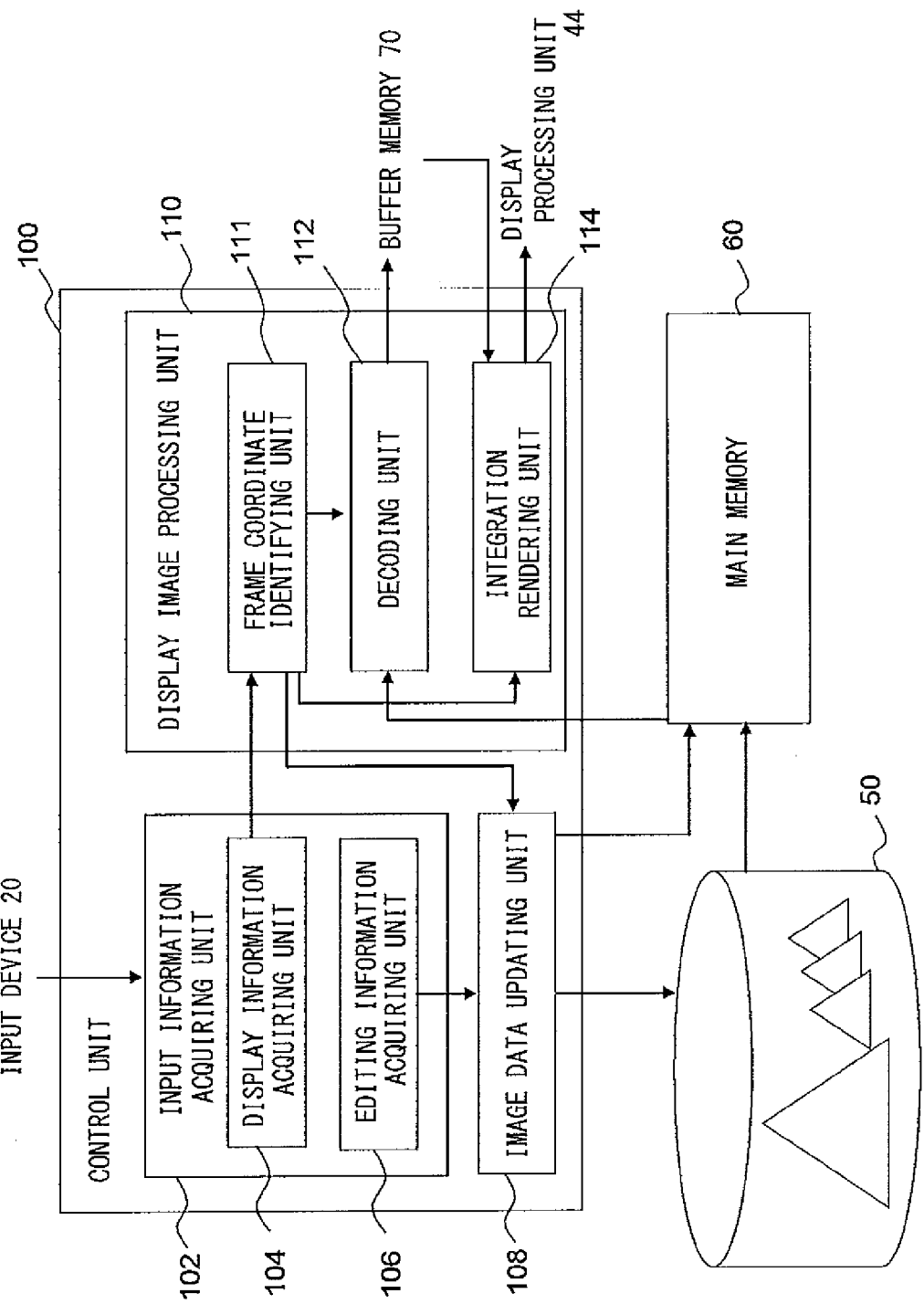
FIG. 6 shows a detailed structure of an image processing apparatus, having an editing function for hierarchical data, in a first embodiment.

FIG. 6 shows a detailed structure of the control unit 100 of the image processing apparatus 10, having an editing function for hierarchical data, in the first embodiment. The control unit 100 includes an input information acquiring unit 102 for acquiring information inputted by the user from the input device 20, a display image processing unit 110 for rendering an image to be displayed while a display region is moved at a user's request, and an image data updating unit 108 for updating the image data according to the user's edit operation.

In FIG. 6 and FIG. 8, FIG. 11 and FIG. 18 shown later, the structural components described as functional blocks that perform various processings may be implemented hardwarewise by elements such as a CPU (Central Processing Unit), memory and other LSIs, and softwarewise by memory-loaded programs or the like. As described already, the control unit 100 has one PPU and a plurality of SPUs, and each functional block may be configured by PPU and SPUs, alone or combined together. Therefore, it will be obvious to those skilled in the art that the functional blocks may be implemented by a variety of manners including hardware only, software only or a combination of both and should not be considered as limiting.

The input information acquiring unit 102 includes a display information acquiring unit 104 for acquiring the content of instruction inputs regarding the image display such as start/end of image display and a movement of display region and an editing information acquiring unit 106 for acquiring the information on the user's edit content for a displayed image. Here, the "edit content" includes the shape of figure or characters drawn by the user and the color, size, position and the like thereof. In the present embodiment, the user enlarges, reduces, and scrolls (drags) an image region displayed on the display device 12 by using the input device 20. With a desired region being displayed thereon, the user selects a figure, character, color, or size and then applies the selected one to the displayed region, or draws a picture freehand with the cursor.

In this case, the display-region-moving request signal is received by the display information acquiring unit 104, whereas an edit operation signal for drawing a figure and the like is received by the editing information acquiring unit 106. The processing carried out by the editing information acquiring unit 106 may be similar to that carried out by a general image rendering tool, and its specific method for the edit operation is not limited to any particular one. The information acquired by the display information acquiring unit 104 is supplied to the display image processing unit 110. The information acquired by the editing information acquiring unit 106 is supplied to the image data updating unit 108.

The display image processing unit 110 includes a frame coordinate identifying unit 111 for identifying the frame coordinates of a region to be newly displayed in response to the user's display-region-moving request, a decoding unit 112 for decoding tile images to be decoded anew, and an integration rendering unit 114 for performing a rendering process by combining the original hierarchical data with another hierarchical data indicating an updated portion.

The frame coordinate identifying unit 111 obtains a shift amount up to the display of the next frame, based on the information of the display-region-moving request and then identifies the frame coordinates to be displayed anew, based on the present frame coordinates. The decoding unit 112 reads and decodes necessary tile images from the main memory 60, based on the frame coordinates identified by the frame coordinates identifying unit 111 and then stores them in the buffer memory 70. Here, the data to be decoded includes not only the original hierarchical data but also another hierarchical data indicating the updated portion if necessary.

If the data of the necessary tile images is not stored in the main memory 60, the decoding unit 112 will load the data from the hard disk drive 50. The method for determining the areas to be loaded into the main memory and the area to be stored to the buffer memory 70 is not limited to any particular one, as long as there areas are each in a predetermined range including the area of the frame coordinates. The image display with satisfactory responsiveness to the display region-moving-request can be made if a region comparatively larger than the frame size is decoded beforehand or if, as described above, regions required later are loaded and decoded by prefetch the regions, for example.

The integration rendering unit 114 reads from the buffer memory 70 the image data of a region corresponding to the frame coordinates identified by the frame coordinate identifying unit 111 and renders the image data in the frame memory of the display processing unit 44. As will be discussed later, in the present embodiment, the following will be a basic procedure to do. That is, an image of another hierarchical data is superposed on the image of the original hierarchical data if there is said image of another hierarchical data indicating the updated portion after the user has edited the image.

Thus, the integration rendering unit 114 references the data representing the positional correspondence relation between the respective hierarchical data. And if there is images that need to be superposed in the region of the frame coordinates to be displayed anew, the integration rendering unit 114 will superpose the images and then store it in the frame memory.

If no editing has been done or there is no need to superpose, the original hierarchical data only will be rendered.

The image data updating unit 108 receives, from the editing information acquiring unit 106, the information concerning the image editing operation done by the user. Upon receipt of the image editing operation information, the image data updating unit 108 generates or updates hierarchical data different from the original hierarchical data in such a manner as to reflect the image editing operation information in the hierarchical data and stores it in the hard disk drive 50. This update information is also reflected in the data of the tile images loaded into the main memory 60. If the hierarchical data has been generated anew, information indicating the positional correspondence relation with the original hierarchical data will be generated as well and then the thus generated information will be used as additional information of the generated hierarchical data.

Figure 7:
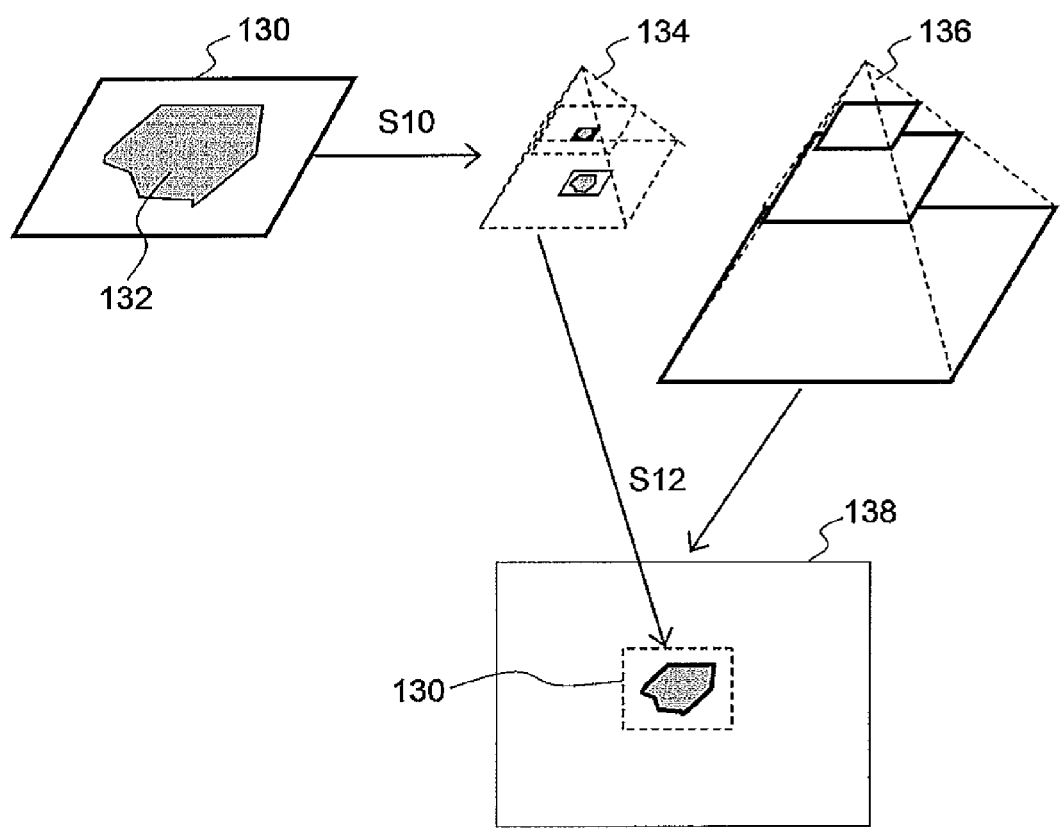
FIG. 7 is a diagram to explain a basic procedure for the data update processing when an image is to be edited, according to a first embodiment.

FIG. 7 is a diagram to explain a basic procedure for the data update processing when an image is to be edited, according to the present embodiment. In FIG. 7 and FIGS. 9, 14, 16 and 17 shown later, the procedure performed by each structural component is shown using S (the capital letter of "Step"), which means a step, and numbers combined. An original image to be edited is first displayed using hierarchical data 136. Suppose that a region 130 is to be edited in the image and the user draws a FIG. 132 using the input device 20. Note that the region 130 may be such a region as one described above which is displayed on the displayed device 12 when he/she starts drawing it.

Then, the image data updating unit 108 generates hierarchical data 134 composed only of the region 130 where the drawing has been done (S10). More specifically, the region 130 to be edited is used as the lowermost layer, and upper hierarchies than this lowermost layer are generated by reducing the lowermost layer, as appropriate, so as to produce hierarchical data. If, for example, a part of the 1st hierarchical level of the original hierarchical data is the region 130, the hierarchical data 134 to be newly generated will be composed of the 1st and the 0-th hierarchical levels. Hereinafter, such hierarchical data or image as this having the update information only will be referred to as "layer".

The image data updating unit 108 leaves the original hierarchical data 136 and stores the newly generated layer 134 in the hard disk drive 50. In so doing, generated is the information concerning a correspondence relation between the region constituting the lowermost layer of the layer 134 and the coordinates in the virtual three-dimensional space formed by the original hierarchical data 136 and then the thus generated information is added to the layer 134. More specifically, the correspondence relation therebetween indicates that the region constituted the lowermost layer of the layer 134 is associated with which coordinates in the virtual 3D space.

As the integration rendering unit 114 of the display image processing unit 110 has checked, by the information concerning the correspondence relation, that the updated region 130 is contained in a frame 138 to be displayed anew, the integration rendering unit 114 displays the image of the layer 134 by superposing the frame 138 on the original hierarchical data 136 (S12). If, at this time, an image whose resolution is higher than that of the lowermost layer data held by the hierarchical data of the layer 134 is to be displayed, the image of the lowermost layer is first enlarged and then superposed on the original hierarchical data 136.

In this manner, the hierarchical data having only the region to be updated is generated as a layer independently of the original hierarchical data. This eliminates the need to reflect the update in a hierarchical level whose resolution is higher, as already mentioned. Hence, the number of tile images that need to be updated is suppressed. As a result, the number of a series of update processings comprised of decoding, rendering and encoding for each tile image is reduced and therefore the load of the processing in the updating can be reduced.

On the other hand, when the layer is generated every time the user draws a figure or the like and confirms the drawing, the number of layers may be enormous depending on the edit amount. As the number of layers increases, the number of superposition processes required when the image is displayed increases as well. This degrades the responsiveness to the display region's movement. This also increases the overall data size and thereby each storage area such as the main memory 60 may be heavily loaded with data.

Figure 8:
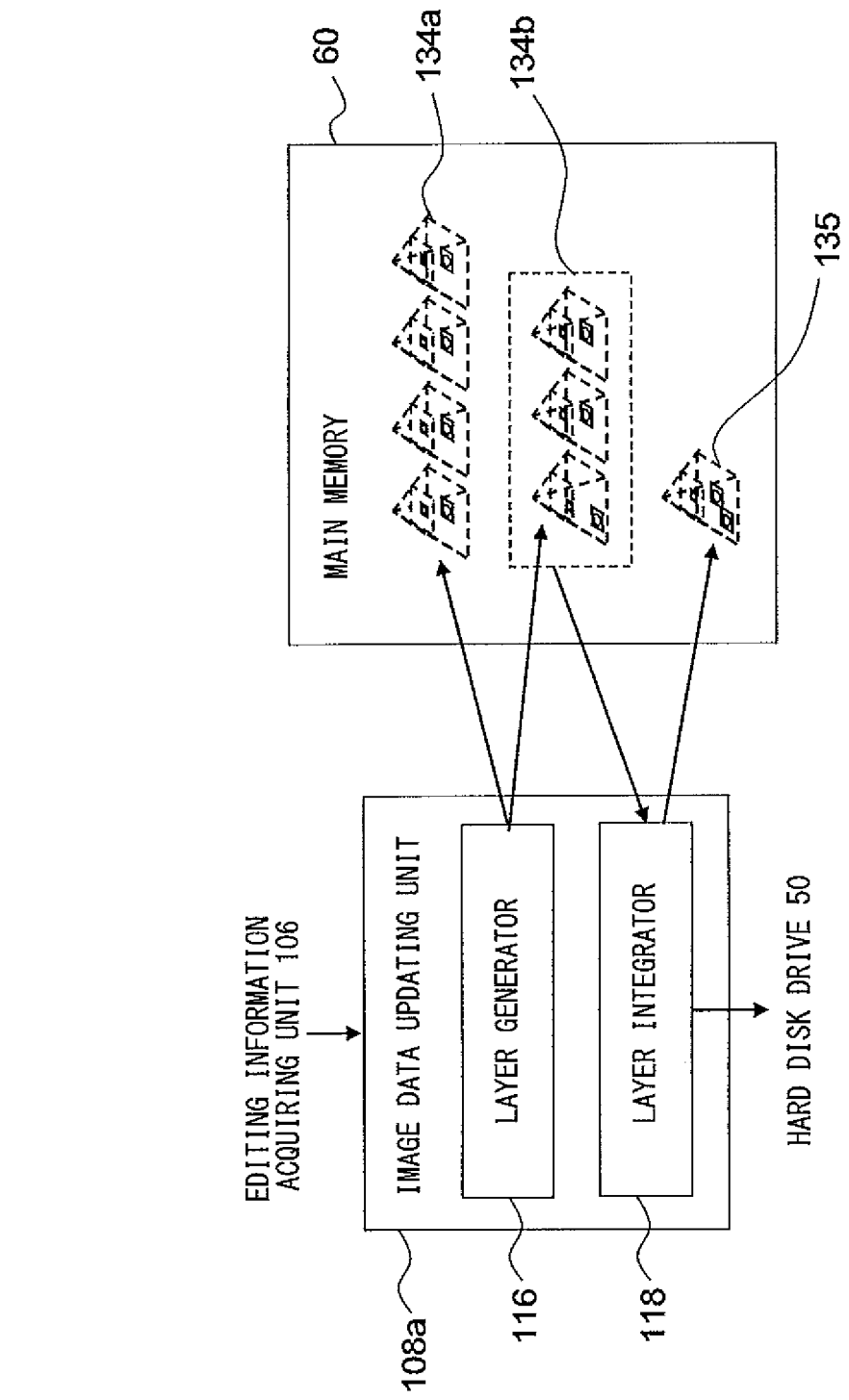
FIG. 8 shows a structure of an image data updating unit including such a mechanism as one that parallely generates and combines layers in a first embodiment.

Thus, in the present embodiment, generating layers and combining the layers are done in parallel with each other. F FIG. 8 shows a structure of the image data updating unit 108 including such a mechanism. An image data updating unit 108a includes a layer generator 116 to generate a layer and a layer integrator 118 to integrate layers. Whenever the user draws a figure or the like on the image to be edited and then confirms the drawing, the layer generator 116 generates a single layer and stores the layer in the main memory 60. Note that the confirmation of the drawing may be automatically recognized in units of figure or may be done when the user enters his/her confirmation input to the input device 20.

The layer integrator 116 combines layers 134a and 134b, stored in the main memory 60 by the layer generator 116, in the background. FIG. 8 illustrates how the three layers 136b are integrated and combined and thereby a single layer 135 is produced. Since the images being edited are successively displayed, the layer integrator 118 generates a newly integrated layer 135 without overwriting the layers 134a and 134b generated by the layer generator 116. Then at the time the integration processing has been completed, the data used for the displaying is switched from the layer 134b before integration to the layer 135 after integration.

The layer 135 where the three layers 134b have been integrated contains the three editing results. Repeating this in a similar manner can reduce the number of layers. And when a user's editing process has been completed, the layer 135 after integration is stored in the hard disk drive 50 and then the layer 135 after integration and the original hierarchical data are used as a single unit of image data. Note that all of layers may be integrated into a single layer. Or the layer after integration may be a plurality of layers under a predetermined policy; for example, layers that are soon to be edited may be integrated for every predetermined number of layers or the layers near an editing region may be integrated for every predetermined partitions or sections.

Figure 9:
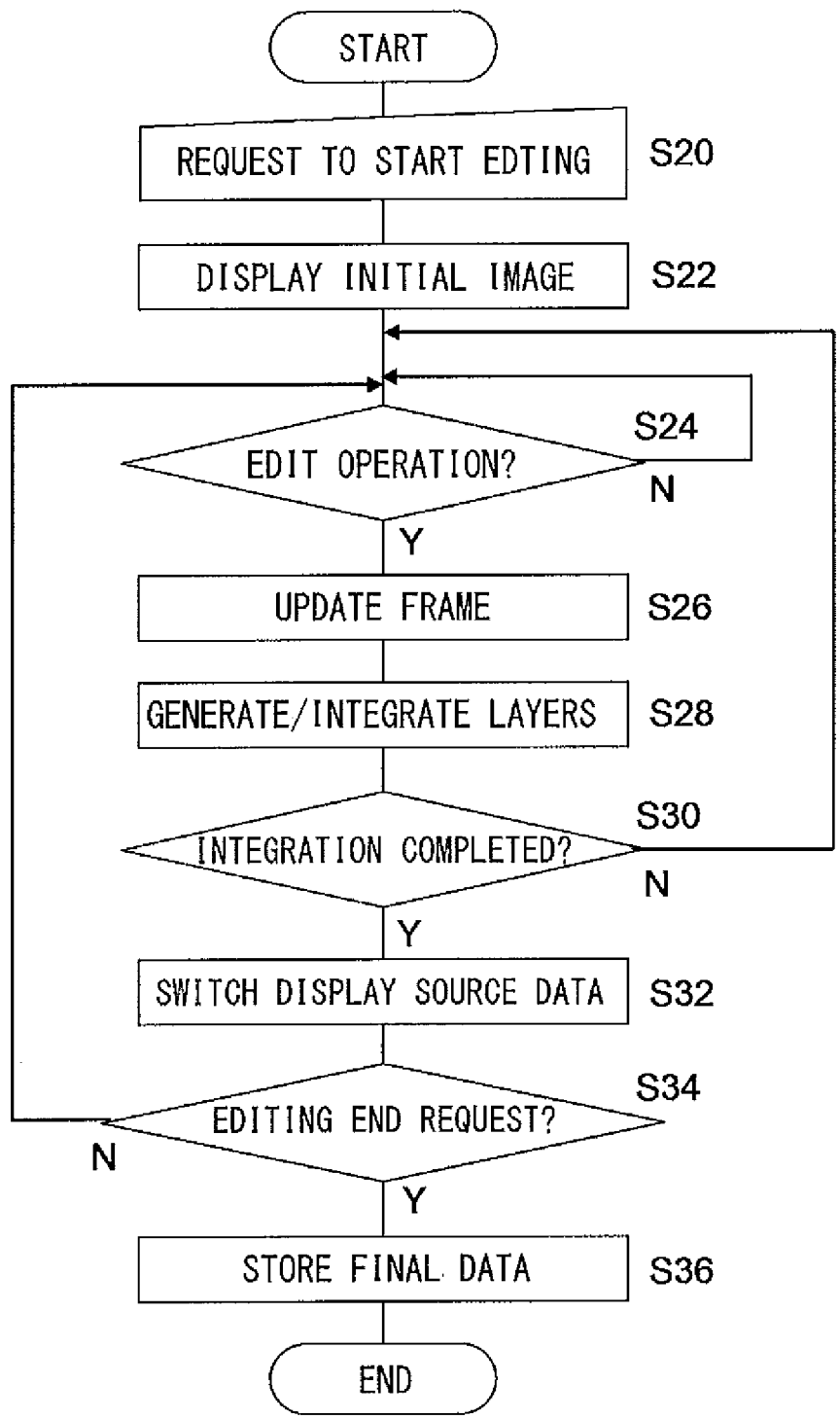
FIG. 9 is a flowchart showing a procedure for updating image data when a user edits an image in a first embodiment.
Figure 14:
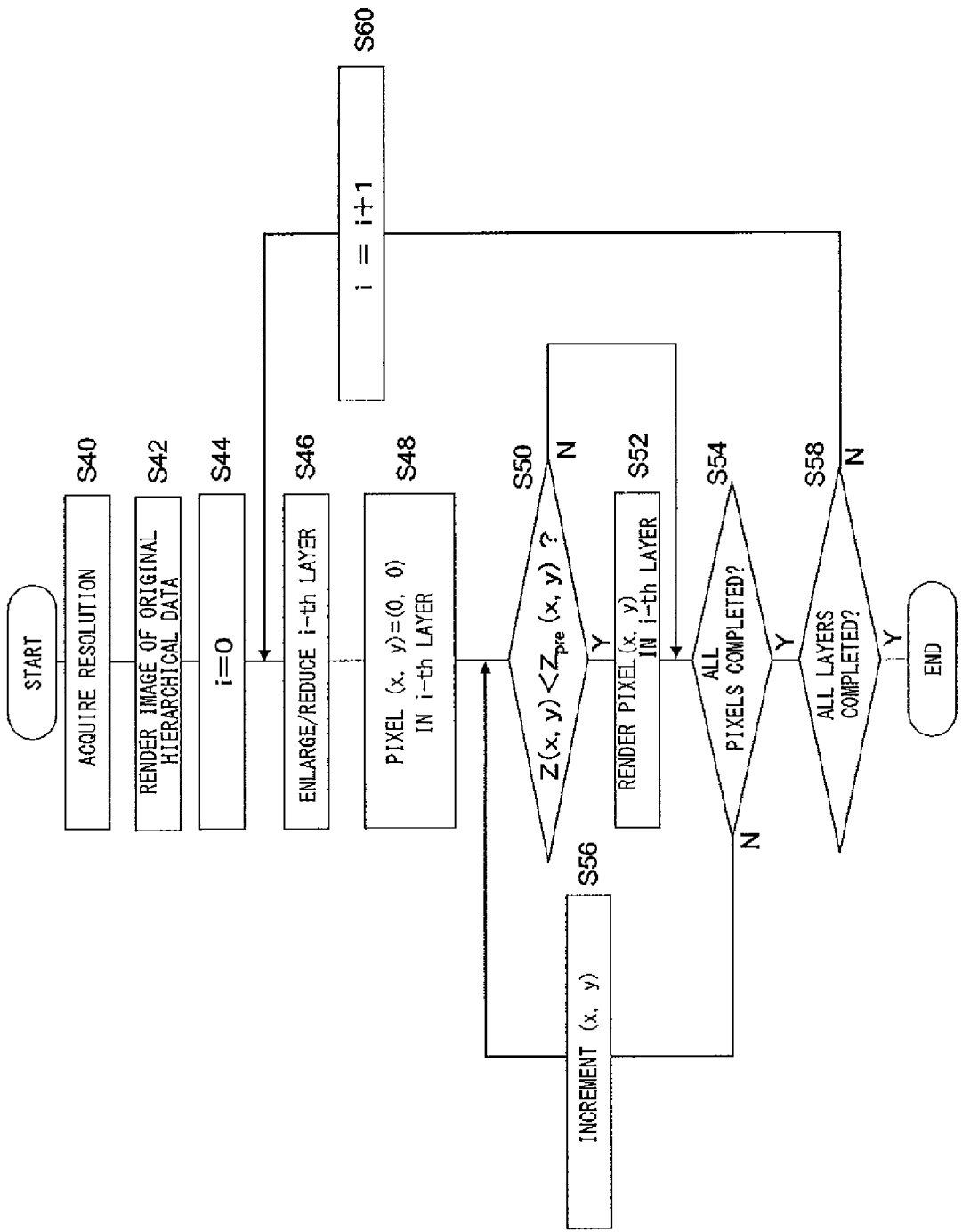
FIG. 14 is a flowchart showing a procedure for displaying an image, in a second embodiment.

An operation of the image processing apparatus 10 configured as above will now be described. FIG. 9 is a flowchart showing a procedure for updating image data when the user edits an image. If a determining process is executed in a processing indicated by the combination of S and a number and if the decision result is positive in the flowchart of FIG. 9 and the flowchart shown in FIG. 14 shown later, "Y" (the capital letter of "Yes") will be appended like "(Y of S10)". If, on the other hand, the decision result is negative, "N" (the capital letter of "No") will be appended like "(N of S10)".

The processing of the flowchart shown in FIG. 9 starts when the user inputs an instruction of his/her decision to edit an image. As the user first specifies image data via the input device 20 and thereby requests that the editing of the image data be started (S20), the display information acquiring unit 104 of the input information acquiring unit 102 loads corresponding hierarchical data from the hard disk drive 50 and then decodes and renders it so as to display a predetermined initial image such as the 0-th hierarchical level (S22).

The display image processing unit 110 stands ready until the user activates an edit operation such as moving a display region and drawing a figure or the like (N of S24). Once the user starts the edit operation (Y of S24), the display image processing unit 110 carries out frame updating processing by, for example, moving the display region according to the display-region-moving request or reflecting a drawing operation on a display (S26). At this time, the figure or the like being drawn is rendered in the working buffer and superposed on the image of the original hierarchical data so as to be displayed until the drawing is confirmed.

Whenever the drawing result is confirmed, the layer generator 116 of the image data updating unit 108 generates a layer composed of hierarchical data whose lowermost layer is the image in the working buffer and then clears the working buffer. At the same time, the layer integrator 118 integrates the generated layers through a background processing (S28). The edit operation continues to be accepted until the integration of layers to be integrated at that point in time has been completed, so that the updating of frame, the generation of layers and the integration of the layers continue until then (N of S30, Y of S24, S26, and S28).

As the integration of layers to be integrated at that point in time has been completed (Y of S30), the data used to display a region shown by said layers to be integrated is switched to the layer after integration (S32). The processes covering Steps S24 to S32 are repeated until an editing end request is inputted by the user (N of S34). As the editing end request is made by the user (Y of S34), the layer after final integration is stored in the hard disk drive 50 and then the process is terminated (S36).

By employing the above-described first embodiment, when the image data having a hierarchical structure is edited, the hierarchical data, having only the region to be updated, which is comprised of a hierarchical level of resolution to be updated and another hierarchical level whose resolution is smaller than that of the hierarchical level to be updated, is generated as a layer. This eliminates the need to reflect the editing result in all the hierarchical levels included in the original hierarchical data and therefore the load on the update processing is reduced. If, in particular, the number of hierarchical levels for image data is large, a region where the editing result is to be reflected will be enormously large in the lowermost image even though a region in a hierarchical level with a low resolution is small. Hence, how the layer is generated according to the first embodiment is significantly advantageous.

Also, the integration processing is performed in parallel with the processing for generating layers. This can prevent the number of layers from increasing unboundedly as the user's edit operation progresses. As a result, the possibilities will be lowered that it takes much time to superpose the images to display an edited image and that a memory region is heavily loaded with data. Note that the maximum allowable number of layers may be set. In this case, if the number of layers hits the maximum number, a warning may be sent to notify the user that the edit operation be postponed until the number of layers is reduced by the integration processing. This can prevent the number of layers from temporarily increasing while the rate at which the layer is generated is higher than the rate at which the layers are combined together.

Second Embodiment

A second embodiment is similar to the first embodiment in that the hierarchical data indicating a portion to be updated is held independently of the original hierarchical data. What makes the second embodiment different from the first embodiment is as follows. While in the first embodiment a new layer is created every time the new drawing is determined, the second embodiment is characterized by the feature that a layer or layers is/are prepared beforehand and the layer or layers is/are updated according an edit operation. "Preparing a layer" means that, in the actual setting, a storage area for data constituting the hierarchical data is reserved. This avoids the increase in the number of layers. The second embodiment can be realized by employing the structure similar to the image processing apparatus 10 as shown in FIG. 4 and the structure similar to the control unit 100 as shown in FIG. 6. A description will be given hereinbelow of the points different from the first embodiment.

Figure 10:
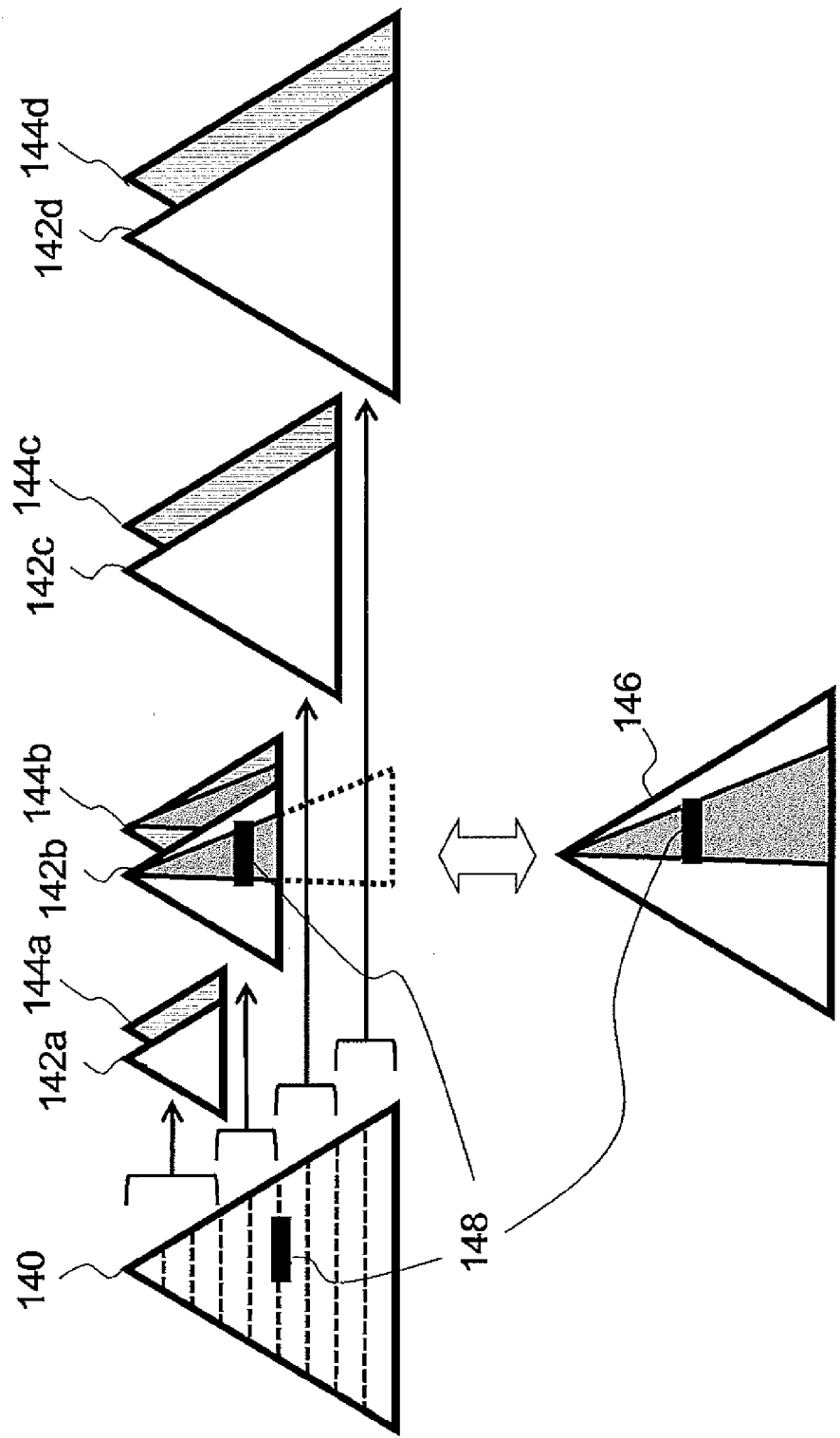
FIG. 10 is a diagram to explain a layer prepared in a second embodiment.

FIG. 10 is a diagram to explain a layer prepared in the second embodiment. In the present embodiment, the hierarchical level of the original hierarchical data is divided into several groups and then one layer is prepared for each group. Referring to FIG. 10, prepared are a 0-th layer 142*a*, a 1st layer 142*b*, a 2nd layer 142*c*, and a 3rd layer 142*d*. That is, the 0-th layer 142*a* is prepared for the 0-th, 1st and 2nd hierarchical levels in the original hierarchical data 140, the 1st layer 142*b* is prepared for the 3rd and 4th hierarchical levels, the 2nd layer 142*c* is prepared for the 5th and 6th hierarchical levels, and the 3rd layer 142*d* is prepared for the 7th and 8th hierarchical levels. The grouping described above in connection with FIG. 10 is merely exemplary and the number of layers and the number of hierarchical levels contained in each layer may be determined, as appropriate, depending on the size of an image and/or the number of hierarchical levels in the original hierarchical data.

When the editing is done on a hierarchical level, in the original hierarchical data 140, a corresponding layer involved in said editing is updated in such a manner as to reflect the editing result. That is, in the example of FIG. 10, a 0-th layer has a total of three hierarchical levels and the remaining layers (1st to 3rd layers) each has a total of two hierarchical levels, so that each layer holds data of images with sizes of the images of corresponding hierarchical levels of the original hierarchical data 140. When, for example, that a region 148 of the 4th hierarchical level in the original hierarchical data 140 is edited, the same region 148 in the corresponding hierarchical level in the corresponding layer, that is, the 1st hierarchical level in the 1st layer is updated.

Further, corresponding region(s) in the other hierarchical levels contained in the 1st layer 142*b*, namely the region in the 0-th hierarchical level, is updated as well. In this case, the updated region 148 is reduced up to the resolution of the hierarchical level and then the tile image including the reduced region is updated. If a 1st hierarchical level of the 0-th layer 142*a* composed of three hierarchical levels is edited, the 2nd hierarchical level directly below the 1st hierarchical level is updated by using the enlarged edited region, and the 0-th hierarchal level directly above the 1st hierarchal is updated by using the reduced edited region.

If the concept of "layer" as introduced in the present embodiments is not employed and therefore all of the hierarchical levels in the original hierarchical data 146 are to be updated, all of the tile images included in the shaded area of the hierarchical data 146 in FIG. 10 must be updated. With the introduction of "layer" in the present embodiment, the tile images to be updated can be restricted to those in hierarchical levels contained in the layer where the edit operation is done (e.g., the shaded area of the 1st layer 142*b*).

If, in the first embodiment, the user edits a great deal in a short time, there may be cases where the speed of layer generation is faster than the speed of layer integration process and therefore uncertainty is likely to be involved in controlling the number of layers. In the second embodiment, the number of layers can be fixed in advance and, furthermore, the hierarchical levels handled by each layer are restricted. Thus, even though the hierarchical level edited by the user changes or his/her editing speed varies, the processing time and the required storage area can be easily estimated.

In the present embodiment, during image display, the rendering is performed such that all layers are superposed on the image of the original hierarchical data. If an image is to be displayed with a resolution higher than that of the lowermost hierarchical level in the original hierarchical data, the images at the lowermost hierarchical levels in all the layers are enlarged to said resolution and then superposed. For other resolutions, an image at a hierarchical level whose resolution is closest in each layer may be enlarged or reduced and then the images having the same resolution may be superposed.

In this case, time series information indicating the order in which the user has done the edit operation is not shared among the other layers. As a result, no matter what order the layers are superposed, there may occur an event, for example, where the figure drawn later is hidden below the figure drawn before. In the light of this, in the present embodiment, another hierarchical data that stores a variable by which to determine the staking order for the superposition is associated with each layer 142*a*, 142*b*, 142*c*, or 142*d*. Since the variable is similar to a Z value indicating the depth information in three-dimensional graphics, the variable will be referred to as "Z value".

As illustrated in FIG. 10, the image layers 142*a*, 142*b*, 142*c*, and 142*d* are associated respectively with Z layers 144*a*, 144*b*, 144*c*, and 144*d*, each of which is hierarchical data composed of the same number of hierarchical levels of image planes with same size as that of the corresponding hierarchical levels of the corresponding image layer and whose pixel values are Z values. When an image layer is updated, the Z layer associated with the image layer is updated as well so that the updated region is displayed on top when all the image layers are superposed on one another.

For the Z layer, too, the update result is reflected in the other hierarchical levels of the same Z layer by enlarging and reducing the updated region. In so doing, the Z value may be determined by a predetermined rule using a value such as the average value, the maximum value or the minimum value when the pixels having different Z values are to be integrated into a single pixel for reducing the updated region.

Figure 11:
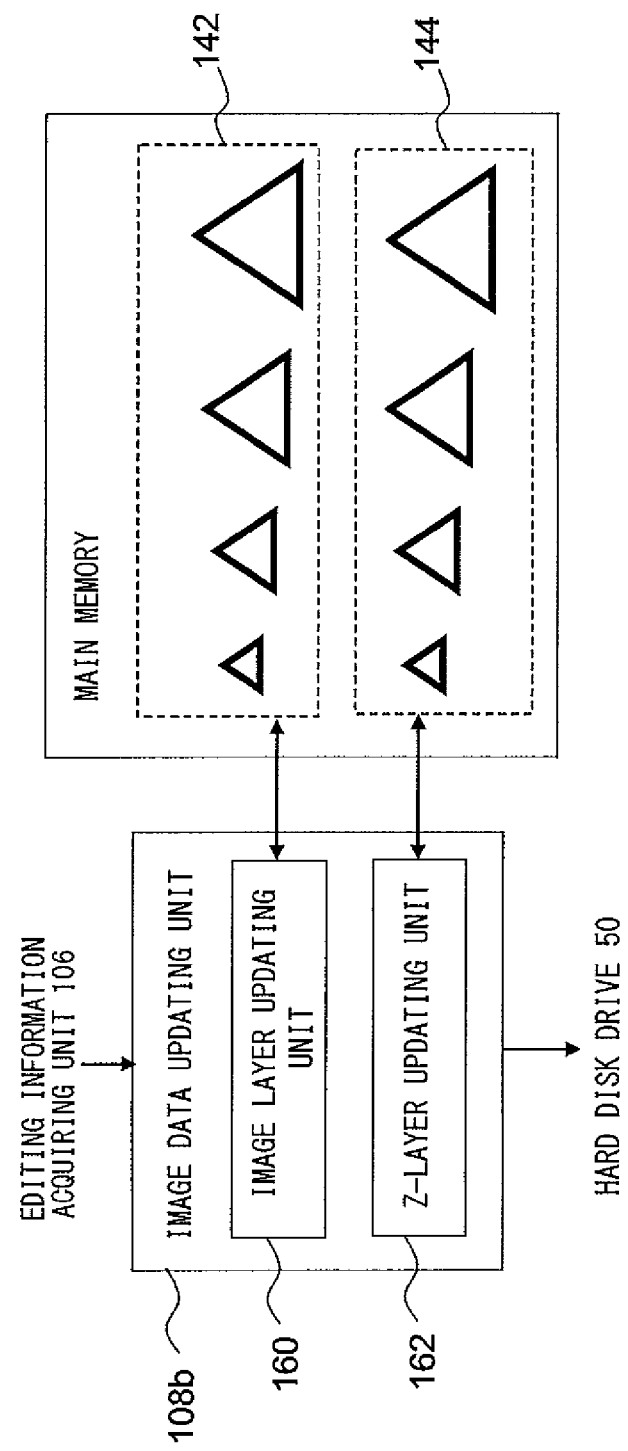
FIG. 11 shows a structure of an image data updating unit according to a second embodiment.

FIG. 11 shows a structure of an image data updating unit 108 according to the second embodiment. An image data updating unit 108*b* includes an image layer updating unit 160 for updating the image layer according to a user's edit operation and a Z-layer updating unit 162 for updating the Z layer. As already mentioned, a plurality of image layers 142 handling different hierarchical levels in the original hierarchical data and Z layers 144 corresponding respectively to the plurality of image layers 142 are prepared in the main memory 60. Whenever a user's editing action is taken, the image layer updating unit 160 updates the tile images of the corresponding region in the image layer 142 handling a hierarchical level to be edited in such a manner as to reflect the user's edit content.

The Z-layer updating unit 162 updates the Z value of the corresponding region in the Z layer 144 associated with the image layer updated by the image layer updating unit 160. In this process, a Z value is determined such that the corresponding region of the updated layer is superposed on top relative to the other layers by referring to Z values given so far to the corresponding regions in all the layers. Suppose, for example, that the Z value is such that the lower the layer is placed when superposing, the larger the Z value will become. Then the Z value of a region to be updated will be updated such that the Z value thereof is smaller than the Z values of the corresponding regions in all the layers.

During image display, the integration rendering unit 114 of the display image processing unit 110 compares a Z value of the layer which has been already rendered, against a Z value of the layer which is a target to be rendered. Thereby, the integration rendering unit 114 determines whether to perform the rendering or not, in a similar manner to a Z-test carried out when the three-dimensional graphics are rendered. This always makes the layers displayed in the same order as when they were edited.

Figure 12:
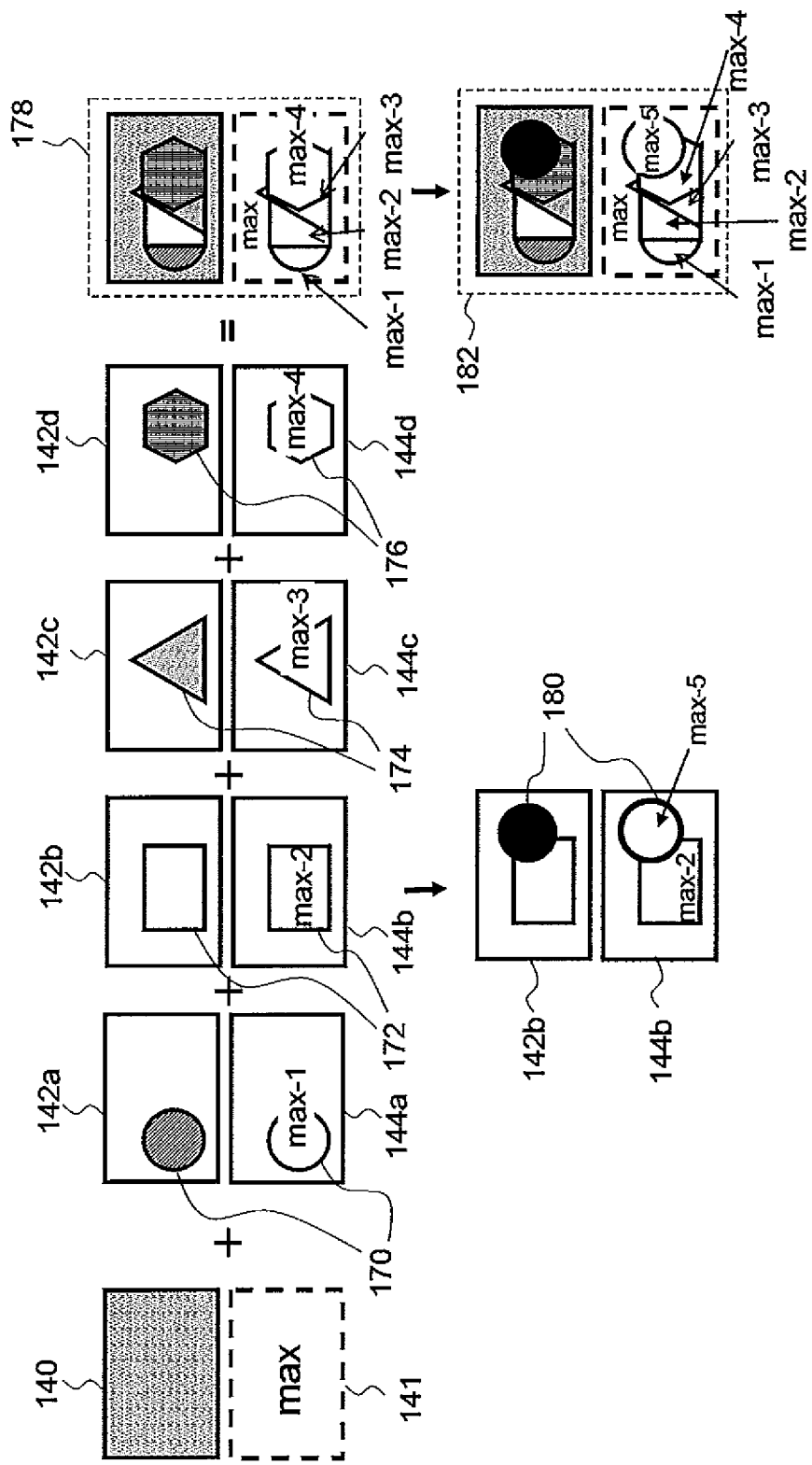
FIG. 12 is a diagram to explain a mode where a Z value is given for each drawn figure in a second embodiment.
Figure 13:
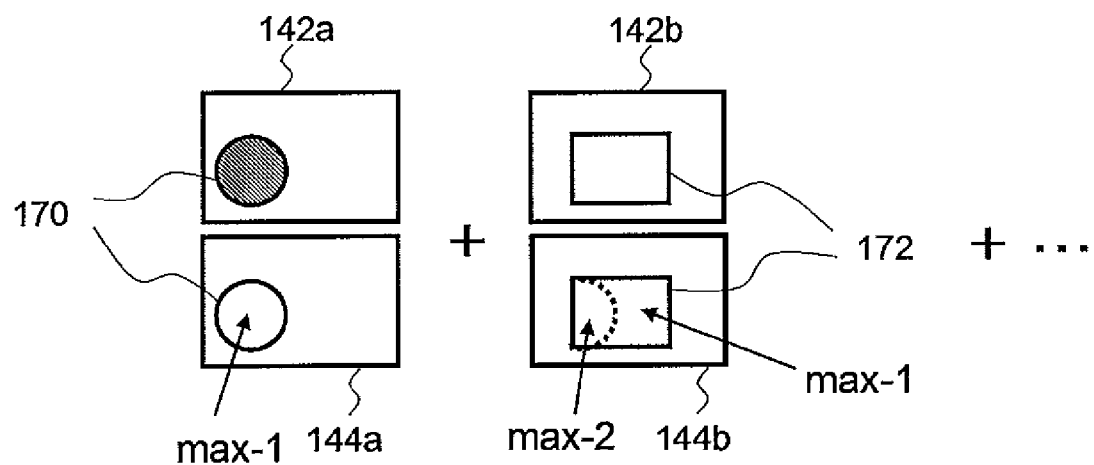
FIG. 13 is a diagram to explain a mode where a Z value is given for each pixel in a second embodiment.

FIG. 12 and FIG. 13 are each a diagram to explain how the Z value is given. For ease of understanding, the image sizes of hierarchical data are set equal to each other in FIG. 12 and FIG. 13. Also, assume herein that the lower a layer is placed at the time it is superposed, the larger the Z value will become. FIG. 12 illustrates a case where the Z value is given for each editing action, namely in units of figure rendered. Assume first that the original hierarchical data 140 is located at infinity. In the practical setting, a maximum value (denoted "max" in FIG. 12) which can be expressed by the bit length prepared as a Z value is used here (see a rectangle 141 outlined with a dashed line in FIG. 12).

Assume here that a circle 170 is drawn on a hierarchical level handled by the 0-th layer 142*a*. Then all of the pixel values of the region of the circle 170 in an image of the Z layer 144*a* associated with said 0-th layer 142*a* are set to a value which is smaller than the maximum value by 1. Then, assume that a rectangle 172 is drawn on a hierarchical level handled by the 1st layer 142*b*. Then, all of the pixel values of the region of the rectangle 172 of the Z layer 144*b* associated with said 1st layer 142*b* are set to a value which is smaller than the value assigned to the circle 170 by 1. That is, all the pixel values of the region of the rectangle 172 associated therewith are set to a value which is smaller than the maximum value by 2.

Then, assume that a triangle 174 is drawn on a hierarchical level handled by the 2nd layer 142*c*. Then, all of the pixel values of the region of the triangle 174 of the Z layer 144*c* associated with said 2nd layer 142*c* are set to a value which is smaller than the value assigned to the rectangle 172 by 1. That is, all the pixel values of the region of the triangle 174 associated therewith are set to a value which is smaller than the maximum value by 3. Assume now that a hexagon 176 is drawn on a hierarchical level handled by the 3rd layer 142*d*. Then, similar to the above procedure, all of the pixel values of the region of the hexagon 176 of the Z layer 144*d* associated with said 3rd layer 142*d* are set to a value which is smaller than the value assigned to the triangle 174 by 1. That is, all the pixel values of the region of the hexagon 176 associated therewith are set to a value which is smaller than the maximum value by 4.

The Z values are given in this manner. Thus the Z value given to a figure drawn last is stored in a register or the like, and the Z value of a new figure is determined by subtracting "1" from the Z value stored last. If, during image display, the Z value of the pixels of a layer which is the target to be rendered is larger than the Z value of the layer which has already been rendered, it is determined that such pixels is not overwritten, regardless of the rendering order of the layers. Thereby, the superposed images exactly reflecting the user's drawing order can be displayed. In the example of an image after superposition shown in FIG. 12, the circle, the rectangle, the triangle, and the hexagon are superposed in this order from below, in descending order of Z values (see a rectangle 178 outlined with a dashed line in FIG. 12).

If, at this stage, a blacked-out circle 180 is newly drawn on the hierarchical level handled by the 1st layer 142*b*, the Z value of the region of the blacked-out circle 180 is set to a value which is smaller, by 1, than the Z value of the hexagon 176 drawn on the 3rd layer 142*d* immediately before the blacked-out circle 180. That is, the Z value of the region of the blacked-out circle 180 is set to a value which is smaller than the maximum value by 5. This enables a display where the superposition orders of the rectangle 172 and the blacked-out circle 180 are separate from each other, even though both of them belong to the same 1st layer 142*b*, and thus the drawing order can be correctly reflected (see a rectangle 182 outlined with a dashed line in FIG. 12).

FIG. 13 is a diagram to explain a case where a Z value is given for each pixel. Assume here that, similar to FIG. 12, the circle 170 and the rectangle 172 are drawn on the 0-th layer 142*a* and the 1st layer 142*b* in this order, respectively. Since all the regions of the circle 170 drawn on the 0-th layer 142*a* lie directly above the image of the original hierarchical data, the Z value of the regions thereof is set to a value smaller than the maximum value by 1, similarly to FIG. 12.

Assume now that the rectangle 172 is drawn on the 1st layer 142*b*. In terms of per-pixel basis, a region overlapping with the circle 170 and the region positioned directly above the image of the original hierarchical data are mixed in the region of the rectangle 172. In the light of this, the region overlapping with the circle 170 is assigned a value smaller than the Z value of the circle 170 by 1, whereas the region directly above the original hierarchical data is assigned a value smaller than the maximum value by 1. This method, too, enables a display in the correct order of superposition regardless of the rendering order of layers, similarly to FIG. 12.

In this case, the Z layer updating unit 162 stores, pixel by pixel, the minimum value of Z values already given for each hierarchical level of each layer. Then each of pixels contained in the region to be updated anew is assigned a value smaller, by 1, than the minimum Z value stored. Though, in the examples shown in FIG. 12 and FIG. 13, the Z value is given in a manner in units of one, such a unit width may not be one as long as the Z value can be made smaller so that a figure drawn later can always be displayed on top.

As the Z value is getting smaller after each edit operation, the Z value may induce underfloor and may return to the maximum value again. Though the Z value is given in ascending order, overflow may occur. In such cases, the Z values need to be reordered, for example, and therefore the Z value is preferably given in units of as small a number as possible. As compared with the case where the Z value is given in units of figure or pattern as in FIG. 12, the consumption of Z values can be suppressed if it is given in units of pixel. At the same time, it is desirable that a sufficiently long bit-length for Z value be prepared to handle the edit amount.

The data update processing, during image editing, according to the second embodiment can be achieved if the Steps S28 to S32 in the flowchart shown in FIG. 9 according to the first embodiment are replaced by the update processing for updating the image layer prepared beforehand and the update processing for updating the Z layer associated with the image layer. FIG. 14 is a flowchart showing a procedure performed during image display. The processing of the flowchart shown in FIG. 14 starts when the user enters the request for moving a display region using the input device 20.

The frame coordinate identifying unit 111 first identifies the frame coordinates of a region to be newly displayed. And such information on the thus identified coordinates thereof includes the resolution of an image (S40). The decoding unit 112 decodes the original hierarchical data and each layer according to the information as necessary and the integration rendering unit 114 first renders a frame of the original hierarchical data (S42). Then, an image at a hierarchical levels in an arbitrary layer (e.g., the 0-th layer), whose resolution is close to the required resolution is enlarged or reduced to said resolution (S44, S46). At this time, not only the image layer but also the Z layer associated with the image layer is enlarged/reduced.

Then the rendering is performed, as follows, such that the image of the 0-th layer is superposed on the image of the original hierarchical data. That is, in the order starting from the pixel at the coordinates (0, 0) (S48), the Z value Z(x, y) in the Z layer associated with the 0-th layer is compared with the current Z value $Z_{pre}(x, y)$ that has been rendered in the same pixel. If Z(x, y) is smaller than the current Z value $Z_{pre}(x, y)$ (Y of S50), the pixel of the 0-th layer will be drawn (S52). If Z(x, y) is larger than or equal to the current Z value $Z_{pre}(x, y)$, no rendering will be performed (N of S50).

Then the coordinates (x, y) is incremented and the similar processing is performed on the next pixel (N of S54, S56, S50, S52). As the processing has been performed on all pixels of the 0-th layer (Y of S54), the same processing will be repeatedly performed on the 1st layer, the 2nd layer, and so forth (N of S58, S60, S46 to S56). Whether the rendering is to be performed or not is determined on all of the pixels of all of the layers and then the rendering is done according to the decision result. Thereby, the pixels of a layer hidden as a result of new drawing will not be rendered, so that appropriated image superposition can be obtained and expressed.

According to the second embodiment described as above, the hierarchical level of the original hierarchical data is divided into a plurality of groups and then an layer for update is prepared for each group. Thus, the number of layers is constant regardless of the edit amount. This makes it easy to estimate the load of the superposition processing during image display and the necessary storage area. Also, since hierarchical levels handled by each layer are restricted, the number of hierarchical levels in which the update result must be reflected is limited and therefore the number of tile images to be updated can be steadily made smaller. Also, the Z values that determine the stacking order for the superposition are held as hierarchical data in association with each layer. Hence, the images can be superposed with accurate order regardless of rendering order of layers, so that the appropriate display of images can be realized.

Third Embodiment

A third embodiment is similar to the first and second embodiments in that the hierarchical data indicating a portion to be updated is kept independently of the original hierarchical data. Also, the third embodiment is similar to the second embodiment in that the hierarchical level of the original hierarchical data is divided into groups and then a layer for update is prepared for each group. Though, in the second embodiment, the time series information indicating the order in which the user has done the edit operation is provided as Z layers separately from the image layers themselves, the third embodiment provides a mechanism that keeps the proper superposition order without provision of the Z layers. The third embodiment can be realized by employing the structure similar to the image processing apparatus 10 as shown in FIG. 4 and the structure similar to the control unit 100 as shown in FIG. 6. A description will be given hereinbelow of the points different from the first and second embodiments.

Figure 15:
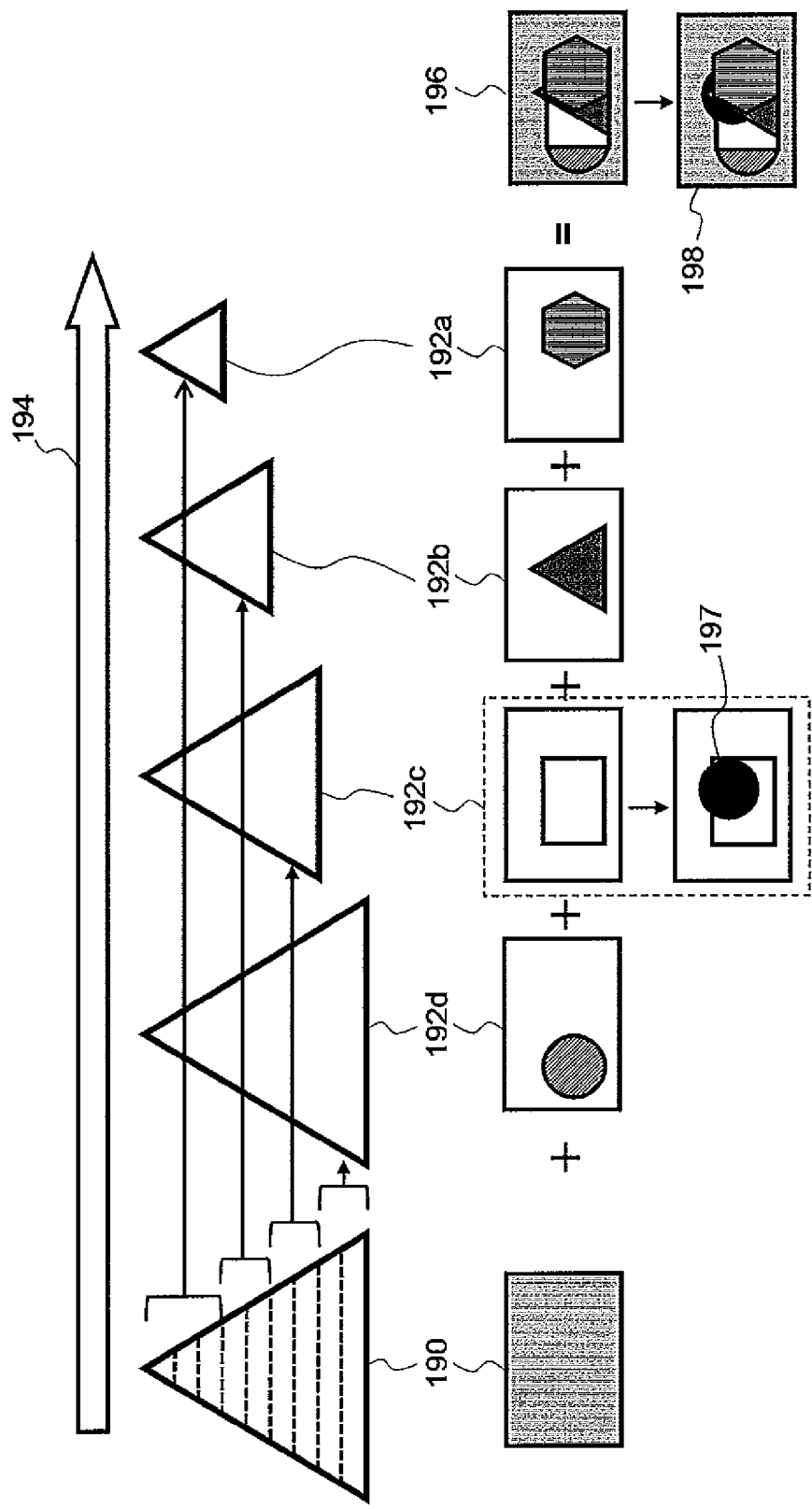
FIG. 15 is a diagram to explain layers to be prepared and the rendering order in a third embodiment.

FIG. 15 is a diagram to explain layers to be prepared and the rendering order in the third embodiment. Similar to the second embodiment, the hierarchical level of the original hierarchical data 190 is divided into groups and then a layer, which is to handle each group, is prepared. In the example of FIG. 15, a 0-th layer 192a handles the 0-th, 1st and 2nd hierarchical levels of the original hierarchical data 190, a 1st layer 192b handles the 3rd and 4th hierarchical levels thereof, a 2nd layer 192c handles the 5th and 6th hierarchical levels thereof, and a 3rd layer 192d handles the 7th and 8th hierarchical levels thereof. Similarly to the second embodiment, if a hierarchical level is updated, the corresponding layer is updated.

A layer handling a hierarchical level, whose resolution is lower, is called a "higher level" layer. As indicated by an arrow 194 of FIG. 15, the rendering order is fixed in the third embodiment. More specifically, after an image in the original hierarchical data is rendered, the rendering is performed successively starting from a layer handling a hierarchical level whose resolution is higher, namely a lower-level layer. In the example of FIG. 15, the rendering is done in the order of the 3rd layer 192d, the 2nd layer 192c, the 1st layer 192b, and the 0-th layer 192a. In this case, as long as a figure or the like is drawn on each layer in this order, an image 196 will be displayed properly when they are superposed on each other.

If, however, a new FIG. 197, for example, is drawn on the 2nd layer 192c, this figure will be overwritten by the 1st layer 192b and the 0-th layer 192a when superposed and therefore the proper image will not be obtained (see an image 198). In the light of this, according to the third embodiment, a clipping process is carried out; that is, an image of a layer at higher level than the layer to be edited anew is copied to said layer to be edited anew and then the layer of which image is copied is made transparent. Accordingly, data of layers in the third embodiment contain α values.

Figure 16:
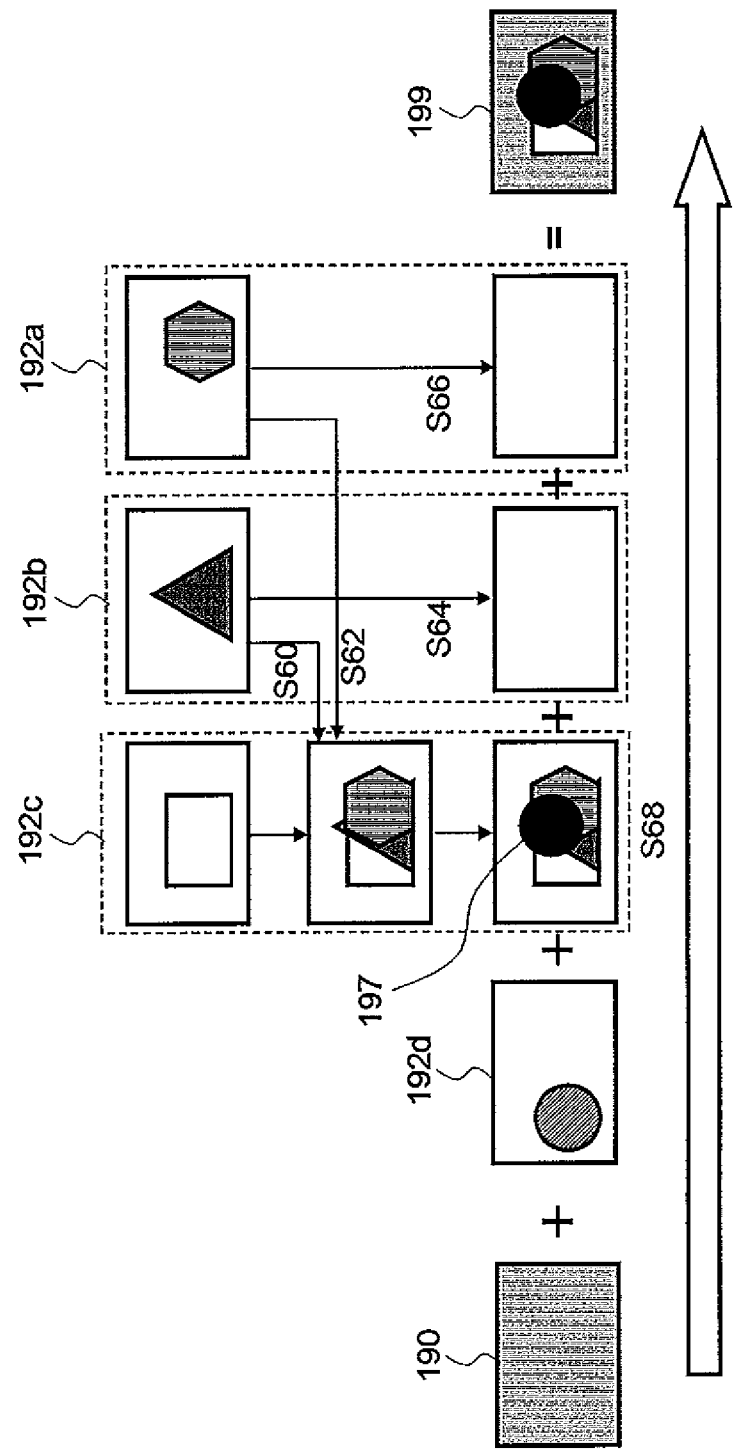
FIG. 16 is a diagram to explain a procedure for updating data in a third embodiment.

FIG. 16 is a diagram to explain a procedure for updating data in the third embodiment. FIG. 16 illustrates a case where a new FIG. 197 is drawn on the 2nd layer 192c as described with referring FIG. 15. Images of the 1st layer 192b and the 0-th layer 192a, which are higher level than the 2nd layer 192c, are first enlarged to the resolutions of the respective hierarchical levels in the 2nd layer 192c and then overwrite the image of the 2nd layer (S60, S62). The overwriting order starts from the lower level layer, similarly to when the images are being displayed.

Then the images of the 1st layer 192b and the 0-th layer 192a, which were source images used in the overwrite process, are made transparent (S64, S66). Then, a new FIG. 197 is drawn on the 2nd layer 192c to be edited and thereby the image is updated (S68). By employing the method described as above, the newly drawn figure is always rendered on top of any of the layers, and a higher-level layer superposed thereafter does not overwrite the newly drawn figure. As a result, a finally displayed image 199 can be an appropriate image, without having to prepare the Z layers as with the second embodiment.

Also, since the layers are superposed starting from a lower layer, the clipping is performed by enlarging an upper level layer towards a lower level layer. This prevents the original information from being lost due to the clipping by reducing a high-resolution image, and the amount of information remains the same before and after the clipping. By employing this method, the layers that need to be updated by a user's edit operation are also limited, so that the load on the update processing is significantly reduced as compared to the case when all the hierarchical levels contained in the original hierarchical data are update.

Figure 17:
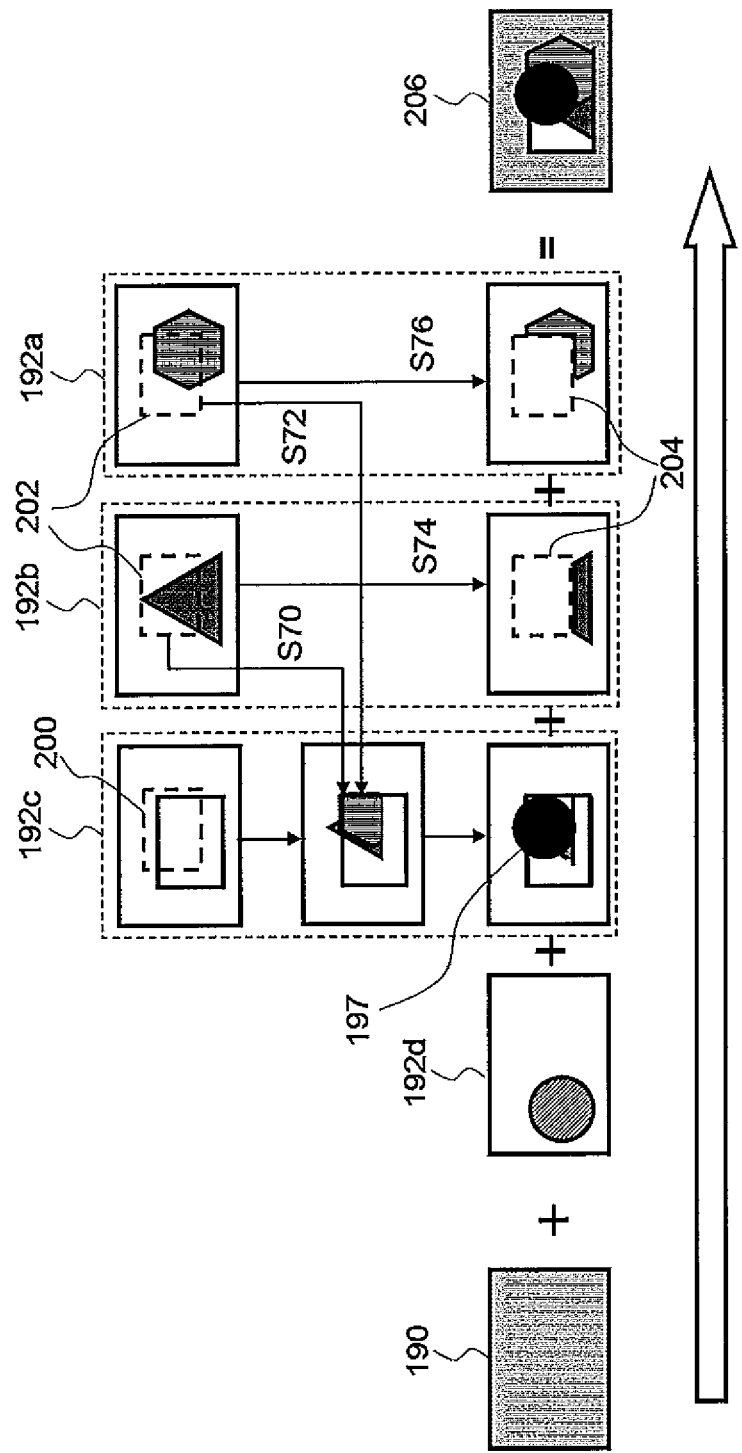
FIG. 17 is a diagram to explain another exemplary procedure for updating data in a third embodiment.

FIG. 17 is a diagram to explain another exemplary procedure for updating data in the third embodiment. In this example, too, similar to FIG. 16, a new FIG. 197 is drawn on the 2nd layer 192c and therefore the images of the 1st layer 192b and the 0-th layer 192a, which are at higher level than the 2nd layer 192c, are clipped to the 2nd layer 192c but what is to be clipped here is restricted to within a region to be edited. Here, the region to be edited is, for example, a region of a frame displayed by the display device 12 while the user is editing. Or the region to be edited is a region in a predetermined range that includes the figure drawn.

In FIG. 17, a region 200 of the 2nd layer 192c is set as the region to be edited. In this case, only the images of the corresponding regions 202 of the 1st layer 192b and the 0-th layer 192a are enlarged and the 2nd layer 192c is overwritten by the enlarged images (S70 and S72) and then the regions 204 of which image is used for overwriting is made transparent (S74, S76). By employing this method, a finally displayed image 206 becomes an appropriate image as well. Compared with the case of FIG. 16, the clipping region is smaller, so that the load of the processing can be reduced.

Figure 18:
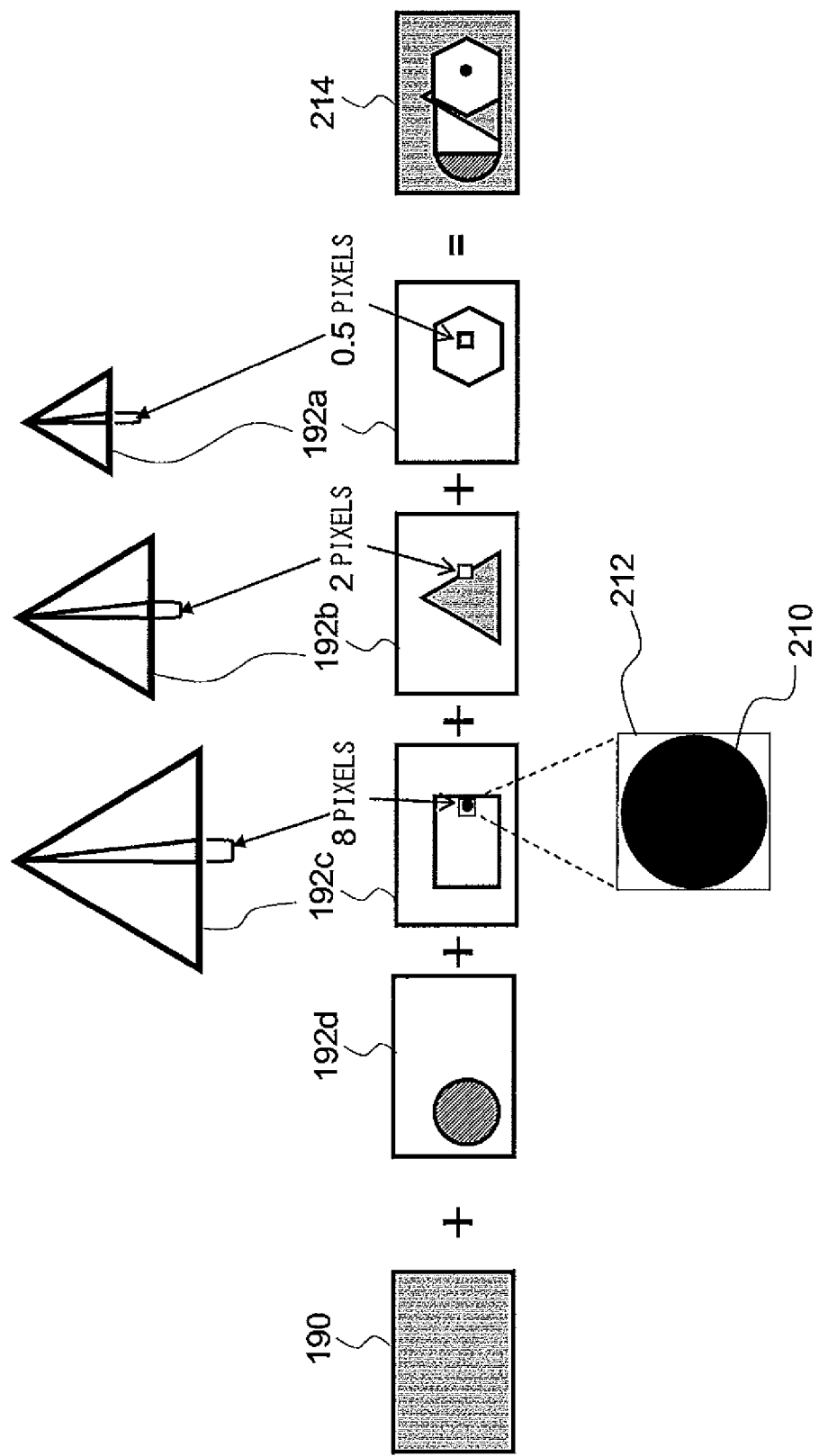
FIG. 18 is a diagram to explain a mode where a rectangle circumscribing a figure drawn in a third embodiment is determined as a clipping region.

In this manner, the smaller the clipping region is, the more advantageous will it be in terms of the load of processing. Thus conceivable is that the clipping region is varied according to the size of a figure drawn. FIG. 18 is a diagram showing a case where a rectangle circumscribing a figure drawn is used as a clipping region in order to minimize the clipping region. In such a case, the load of the processing can be suppressed to the utmost extent but there are cases where the clipping region in an upper level layer is less than 1 pixel, if the region to be edited is too small.

The example of FIG. 18 illustrates a case where a new FIG. 210 is drawn on the lowermost hierarchical level of the 2nd layer 192c, namely the 6th hierarchical level of the original hierarchical data, in the 0-th layer 192a to the 3rd layer 192d handling respective hierarchical levels as shown in FIG. 15. If each side of a rectangle 212 circumscribing the new FIG. 210 is of a size having 8 pixels, each side of a corresponding region of the lowermost hierarchical level of the 1st layer 192b, namely the 4th hierarchical level of the original hierarchical data, is 2 pixels. Then each side of a corresponding region of the lowermost hierarchical level of the 0-th layer 192a, namely the 2nd hierarchical level of the original hierarchical data, is 0.5 pixel.

Since, in such a case, the region of 0.5 pixel cannot be clipped, a displayed image 214 intended by the user cannot be obtained as long as the size of the region is less than 1 pixel. Thus, for the applicable hierarchical level only, the clipping region of less than 1 pixel is rounded up to be 1 pixel. Then the difference region between the original clipping region and an expanded region whose size has been raised to 1 pixel is drawn on the corresponding region in the layer just below, after enlarging the difference region.

Figure 19:
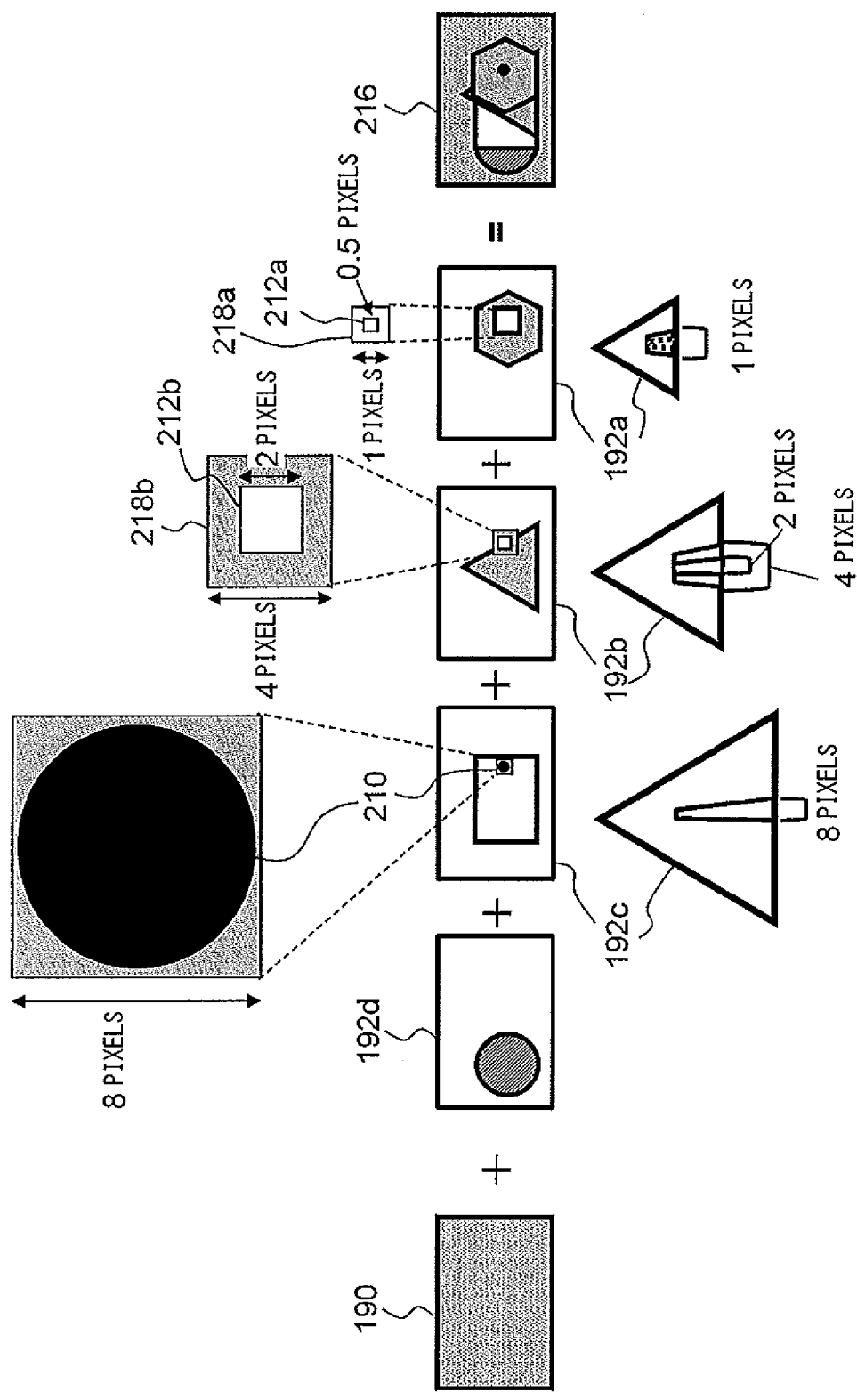
FIG. 19 is a diagram to explain a procedure for updating data when a clipping region is rounded up in a third embodiment.

FIG. 19 is a diagram to explain a procedure for updating data when a clipping region is rounded up. Assume, similarly to FIG. 18, that a region where each side thereof is 8 pixels in the lowermost hierarchical level of the 2nd layer has been updated. In this case, as mentioned already, the size of the clipping region will be less than 1 pixel in the lowermost hierarchical level of the 0-th layer 192a. Accordingly, the size of clipping regions in the other hierarchical levels in the 0-th layer 192 is further small. In this manner, if there is a layer where a clipping region is less than 1 pixel in the lowermost hierarchical level, only the clipping region in the lowermost hierarchical level in said layer is rounded up to 1. Then, the region to be made transparent is not provided in the other hierarchical levels contained in said layer.

In the example of FIG. 19, each side, having 0.5 pixel, of the original clipping region 212a in only the lowermost hierarchical level of the 0-th layer 192a is rounded up to be 1 pixel. Here, the enlarged region of one pixel is composed of the clipping region 212a and its surrounding region 218a. This is because whenever the resolution required during display is higher than the resolution of hierarchical levels handled by a layer, the image at the lowermost hierarchical level in the layer is enlarged and used. If clipping is done not using the pixel of the lowermost hierarchical level, the FIG. 210 drawn on the 2nd layer 192c will be overwritten by the figure of the 0-th layer 102a no matter which resolution is set and therefore the FIG. 210 will not be displayed.

The portion of the original clipping region 212a, whose each side is 0.5 pixel, in the region whose pixel has been rounded up to be 1 pixel and clipped from the lowermost hierarchical level of the 0-th layer 192a is enlarged and rendered in the second layer 192c, which is original destination of the clipping. This region becomes a region whose each side is 8 pixels, in the 2nd layer 192c. Then the portion of the remaining region 218a in the region whose pixel has been rounded up to be 1 pixel and clipped, is rendered in the 1st layer 192b, which is the layer lower by one level than the original 0-th layer 192a (region 218b). Similar to FIG. 18, as a previous step to the above step, a region 212b, whose each side is 2 pixels, in the 1st layer 192b is enlarged to a region, whose each size is 8 pixels, and clipped to the 2nd layer 192c.

Thus, as illustrated in FIG. 19, in the 1st layer 192b, the region 212b, whose each side is 2 pixels, is made transparent, and its surrounding region 218b becomes an image obtained by enlarging the region 218a representing the difference between the original clipping region and the expanded region, whose size has been raised to 1 pixel, in the 0-th layer 192a. As such, an appropriate image 216 can always be displayed at the resolution at which the lowermost hierarchical level of the 0-th layer 192a is enlarged.

If, on the other hand, a low-resolution image is to be displayed using a hierarchical level higher than the lowermost layer of the 0-th layer 192a, for example, the FIG. 210 will also be of a size less than 1 pixel and therefore no problem arises even when the FIG. 210 is overwritten by the image of the 0-th layer 192a. In the example of FIG. 19, the clipping region in every hierarchical levels of the 1st layer 192b has 1 pixel or more. But if a region in a hierarchical level other than the lowermost layer has less than 1 pixel, such a region of less than 1 pixel may not be made transparent for a similar reason.

Figure 20:
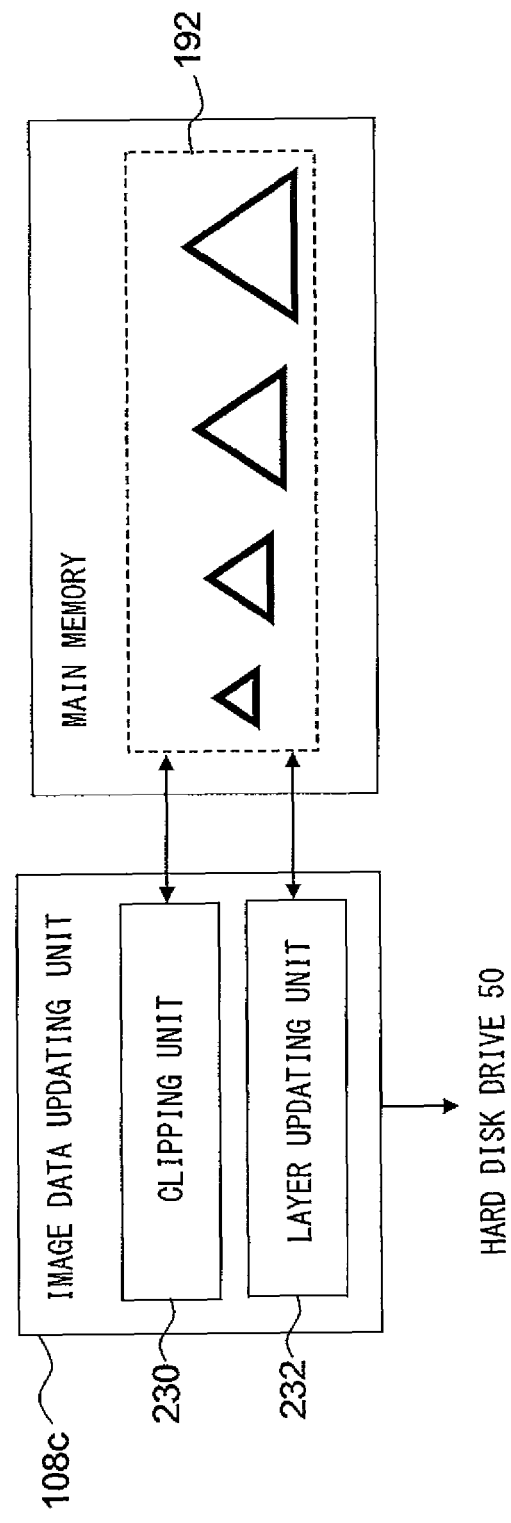
FIG. 20 shows a structure of an image data updating unit according to a third embodiment.

FIG. 20 shows a structure of the image data updating unit 108 according to the third embodiment. An image data updating unit 108c includes a clipping unit 230 and a layer updating unit 232. A plurality of layers 192 handling respective hierarchical levels in the original hierarchical data are prepared in the main memory 60. The clipping unit 230 clips an image from a layer or layers at higher level(s) than the layer to be edited, in the layers 192 stored in the main memory 60, to a layer to be edited. In so doing, the clipped image is enlarged or reduced so that the clipping result can be reflected in all the hierarchical levels contained in the layer to be edited.

For a layer to be clipped, the α value of a clipping region in all the hierarchical levels is set to "0" so as to make the image transparent. The region to be effected may be the entire region as shown in FIG. 16, a region to be edited as shown in FIG. 17 and FIG. 18 or only a region whose size has been raised to the 1 pixel as shown in FIG. 19. The layer updating unit 232 renders a new figure in the layer to be edited and updates said layer. Then the rendering is reflected in all the hierarchical levels containing said layer by enlarging or reducing the image after rendering.

The data update processing, during image editing, according to the third embodiment can be achieved if the Steps S28 to S32 in the flowchart shown in FIG. 9 according to the first embodiment are replaced by the clipping of a layer or layers, in the layers prepared beforehand, which is/are at higher level(s) than the layer to be edited and the updating of the layer to be edited. Also, as described above, the image display processing is performed by simply superposing from lower-level layers to higher-level layers in order on the image of the original hierarchical data.

By employing the above-described third embodiment, the hierarchical level of the original hierarchical data is divided into a plurality of groups and then a layer for update is prepared for each group. During the editing process, the clipping from a layer or layers at higher level(s) than the layer to be edited is performed and then a newly rendered figure is overwritten on it. Thus, the number of layers is constant regardless of the edit amount, similarly to the second embodiment. This makes it easy to estimate the load of the superposition processing during image display and the necessary storage area. Further, use of the Z layers is eliminated, so that a smaller storage area than that in the second embodiment can be used.

Also, the layers to be updated are limited to the edited layer and a layer or layers higher than the edited layer. This reduces the possibility that the image having a high resolution must be updated over a wide range. Hence, the load on the update processing can be reduced. During image display, it is only necessary to simply superpose the images from a lower layer and therefore the image display with a reduced load on the processing and a high responsiveness can be made.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

For example, the image processing apparatus 10 according to the present embodiments has the functions of both editing and displaying the hierarchical data but it may have the displaying function only. In such a case, too, the image edited according to the present embodiments can be displayed by superposing the layers on the original hierarchical data.

What is claimed is:

1. An image processing apparatus comprising:
a storage unit for storing hierarchical data for each of one or more images, the hierarchical data being formed such that respective image data representing respective ones of the images at different resolutions is hierarchized in order of resolution;
a display image processing unit configured to render one of the images in a display region by switching a hierarchical level of the hierarchical data for the one of the images in response to a request for changing the display region, inputted by a user; and
an image data updating unit configured to: (i) receive edit operation input from the user for the rendered image in the display region, and (ii) in response to the edit operation input, store, as edited data in the storage unit, both the hierarchical data for the one of the images as original hierarchical data and updating hierarchical data, which represents an edited image of only a region within the original hierarchical data,
wherein the image data updating unit associates each of a plurality of groups of hierarchical levels, which is obtained when the original hierarchical data is divided, with the updating hierarchical data that differs for each of the plurality of groups, and the image data updating unit updates the updating hierarchical data associated with a group including a hierarchical level containing the region to be edited, according to the user's edit operation input,
wherein prior to updating the updating hierarchical data, associated with the group including the hierarchical level containing the region to be edited, the image data updating unit copies at least part of the image of the updating hierarchical data, which is superposed after an image of the updating hierarchical data to be updated when the display image processing unit performs rendering, to the image of the updating hierarchical data to be updated,
wherein the image data updating unit copies at least part of an image of the updating hierarchical data associated with a group of hierarchical levels, whose resolutions are lower than the updating hierarchical data to be edited, to an image of the updating hierarchical data to be edited,
wherein, when a region to be made transparent in the updating hierarchical data is of a size less than one pixel, the image data updating unit rounds the size up to be one pixel and copies a difference region between a region that is to be copied to the image of the updating hierarchical data to be updated and a region that has been rounded up to be one pixel, to an image of the updating hierarchical data associated with a group of hierarchical levels that is one directly below the updating hierarchical data,
wherein the display image processing unit performs rendering such that all images of the updating hierarchical data is superposed on the image of the original hierarchical data,
wherein the image data updating unit makes transparent a region of a source image in the updating hierarchical data which is copied, and
wherein the display image processing unit superposes images of the updating hierarchical data, starting successively from data associated with a group of hierarchical levels whose resolutions are higher, onto the image of the original hierarchical data.

2. An image processing apparatus according to claim 1, wherein, the image data updating unit generates hierarchical data of images for stacking order information, in association with each unit of the updating hierarchical data, the image for stacking order information representing, as pixel values, a parameter that expresses stacking order of images of the updating hierarchical data to be superposed when rendering, and when the updating hierarchical data is updated, the image data updating unit updates the hierarchical data of images for stacking order information in a manner such that a region to be updated anew is rendered on top, and
wherein the display image processing unit references the hierarchical data of images for stacking order information and renders each pixel by use of pixel data to be rendered on top, in the images of the updating hierarchical data.

3. An image processing apparatus according to claim 2, wherein the image data updating unit determines the pixel values of the images for stacking order information, in units of figure rendered by the user's edit operation input.

4. An image processing apparatus according to claim 2, wherein the image data updating unit determines the pixel values of the images for stacking order information, in units of pixel included in figure rendered by the user's edit operation input.

5. An image processing apparatus according to claim 1, wherein, every time the image data updating unit receives the user's edit operation input, the image data updating unit generates new updating hierarchical data representing only a region to be edited and comprised of hierarchical levels whose resolutions are less than or equal to the resolution to be edited.

6. An image processing apparatus according to claim 5, wherein the image data updating unit performs a process of combining a plurality of the updating hierarchical data generated in a background.

7. The image processing apparatus of claim 1, further comprising:
 a decoding unit configured to decode the original hierarchical data and the updating hierarchical data; and
 an integration rendering unit configured to switch hierarchical levels in each of the hierarchical data and the updating hierarchical data in response to the request, for changing the display region, inputted by the user and then configured to interpose images of the decoded data so as be rendered.

8. An image processing method comprising:
 storing hierarchical data for each of one or more images and retrieving the hierarchical data, the hierarchical data being formed such that respective image data representing respective ones of the images at different resolutions is hierarchized in order of resolution;
 rendering one of the images in a display region by switching a hierarchical level of the hierarchical data for the one of the images in response to a request for changing the display region, inputted by a user; and
 updating by: (i) receiving edit operation input from the user for the rendered image in the display region, and (ii) in response to the edit operation input, storing, as edited data in the storage unit, both the hierarchical data for the one of the images as original hierarchical data and updating hierarchical data, which represents an edited image of only a region within the original hierarchical data,
 wherein the updating includes associating each of a plurality of groups of hierarchical levels, which is obtained when the original hierarchical data is divided, with the updating hierarchical data that differs for each of the plurality of groups, and updating the updating hierarchical data associated with a group including a hierarchical level containing the region to be edited, according to the user's edit operation input,
 wherein prior to updating the updating hierarchical data associated with the group including the hierarchical level containing the region to be edited, copying at least part of the image of the updating hierarchical data, which is superposed after an image of the updating hierarchical data to be updated when rendering, to the image of the updating hierarchical data to be updated,
 wherein the updating includes copying at least part of an image of the updating hierarchical data associated with a group of hierarchical levels, whose resolutions are lower than the updating hierarchical data to be edited, to an image of the updating hierarchical data to be edited,
 wherein, when a region to be made transparent in the updating hierarchical data is of a size less than one pixel, rounding the size up to be one pixel and copying a difference region between a region that is to be copied to the image of the updating hierarchical data to be updated and a region that has been rounded up to be one pixel, to an image of the updating hierarchical data associated with a group of hierarchical levels that is one directly below the updating hierarchical data,
 wherein the rendering includes rendering such that all images of the updating hierarchical data is superposed on the image of the original hierarchical data,
 wherein the updating includes making transparent a region of a source image in the updating hierarchical data which is copied, and
 wherein the rendering includes superposing images of the updating hierarchical data, starting successively from data associated with a group of hierarchical levels whose resolutions are higher, onto the image of the original hierarchical data.

9. A non-transitory computer-readable recording medium containing a computer program, the computer program, which when executed by a processor causes the processor to perform actions, comprising:
 storing hierarchical data for each of one or more images and retrieving the hierarchical data, the hierarchical data being formed such that respective image data representing respective ones of the images at different resolutions is hierarchized in order of resolution;
 rendering one of the images in a display region by switching a hierarchical level of the hierarchical data for the one of the images in response to a request for changing the display region, inputted by a user; and
 updating by: (i) receiving edit operation input from the user for the rendered image in the display region, and (ii) in response to the edit operation input, storing, as edited data in the storage unit, both the hierarchical data for the one of the images as original hierarchical data and updating hierarchical data, which represents an edited image of only a region within the original hierarchical data,
 wherein the updating includes associating each of a plurality of groups of hierarchical levels, which is obtained when the original hierarchical data is divided, with the updating hierarchical data that differs for each of the plurality of groups, and updating the updating hierarchical data associated with a group including a hierarchical level containing the region to be edited, according to the user's edit operation input,
 wherein prior to updating the updating hierarchical data associated with the group including the hierarchical level containing the region to be edited, copying at least part of the image of the updating hierarchical data, which is superposed after an image of the updating hierarchical data to be updated when rendering, to the image of the updating hierarchical data to be updated,
 wherein the updating includes copying at least part of an image of the updating hierarchical data associated with a group of hierarchical levels, whose resolutions are lower than the updating hierarchical data to be edited, to an image of the updating hierarchical data to be edited,
 wherein, when a region to be made transparent in the updating hierarchical data is of a size less than one pixel, rounding the size up to be one pixel and copying a difference region between a region that is to be copied to the image of the updating hierarchical data to be updated and a region that has been rounded up to be one pixel, to an image of the updating hierarchical data associated with a group of hierarchical levels that is one directly below the updating hierarchical data, wherein the rendering includes rendering such that all images of the updating hierarchical data is superposed on the image of the original hierarchical data, wherein the updating includes making transparent a region of a source image in the updating hierarchical data which is copied, and wherein the rendering includes superposing images of the updating hierarchical data, starting successively from data associated with a group of hierarchical levels whose resolutions are higher, onto the image of the original hierarchical data.

* * * * *